United States Patent
Watson et al.

(10) Patent No.: US 9,330,878 B2
(45) Date of Patent: May 3, 2016

(54) ELECTROMECHANICAL X-RAY GENERATOR

(71) Applicant: Los Alamos National Security, LLC, Los Alamos, NM (US)

(72) Inventors: Scott A Watson, Los Alamos, NM (US); David Platts, Los Alamos, NM (US); Eric B Sorensen, Los Alamos, NH (US)

(73) Assignee: Los Alamos National Security, LLC., Los Alamos, NM (US)

(*) Notice: Subject to any disclaimer, the term of this patent is extended or adjusted under 35 U.S.C. 154(b) by 0 days.

(21) Appl. No.: 14/736,973

(22) Filed: Jun. 11, 2015

(65) Prior Publication Data

US 2015/0371806 A1    Dec. 24, 2015

Related U.S. Application Data

(60) Provisional application No. 62/013,743, filed on Jun. 18, 2014.

(51) Int. Cl.

| | |
|---|---|
| *H05G 1/06* | (2006.01) |
| *H01J 19/24* | (2006.01) |
| *H01J 21/36* | (2006.01) |
| *H01J 27/02* | (2006.01) |
| *H01J 35/06* | (2006.01) |
| *G01G 1/06* | (2006.01) |
| *G01G 1/10* | (2006.01) |
| *G01G 1/20* | (2006.01) |
| *H01G 5/14* | (2006.01) |
| *H05G 1/10* | (2006.01) |
| *H05G 1/20* | (2006.01) |

(52) U.S. Cl.
CPC . *H01J 19/24* (2013.01); *G01G 1/06* (2013.01); *G01G 1/10* (2013.01); *G01G 1/20* (2013.01); *H01G 5/14* (2013.01); *H01J 21/36* (2013.01); *H01J 27/022* (2013.01); *H01J 35/065* (2013.01); *H05G 1/06* (2013.01); *H05G 1/10* (2013.01); *H05G 1/20* (2013.01)

(58) Field of Classification Search
CPC .......... B82Y 10/00; H05G 1/06; H05G 1/10; H05G 1/20
See application file for complete search history.

(56) References Cited

U.S. PATENT DOCUMENTS

| | | | | |
|---|---|---|---|---|
| 2,675,516 | A | 4/1954 | Felici | |
| 4,175,830 | A * | 11/1979 | Marie | G02B 5/3083 359/280 |
| 5,442,677 | A * | 8/1995 | Golden | H05G 1/06 378/101 |
| 6,473,289 | B1 * | 10/2002 | Weisse | H01G 5/14 361/278 |
| 7,106,063 | B1 * | 9/2006 | Zens | G01R 33/34069 324/318 |

(Continued)

OTHER PUBLICATIONS

A. Isoya et al., "1 MV Rotating—Disc Type High Voltage Generator for Application to an Implanter", published by Nuclear Instruments and Methods in Physics Research B6 (1985) 250-257 North-Holland, Amsterdam.

(Continued)

*Primary Examiner* — Vibol Tan
(74) *Attorney, Agent, or Firm* — LeonardPatel PC

(57) ABSTRACT

An electro-mechanical x-ray generator configured to obtain high-energy operation with favorable energy-weight scaling. The electro-mechanical x-ray generator may include a pair of capacitor plates. The capacitor plates may be charged to a predefined voltage and may be separated to generate higher voltages on the order of hundreds of kV in the AK gap. The high voltage may be generated in a vacuum tube.

19 Claims, 21 Drawing Sheets

(56) References Cited

U.S. PATENT DOCUMENTS 8,643,249 B2　2/2014　Post
2014/0226791 A1　8/2014　Golden et al.

OTHER PUBLICATIONS

A. Isoya et al., "Rotating-Disc Type High Voltage Generator", Published in Nuclear Instruments and Methods in Physical Research A236 (1985).

A. Sivathanu Pillai et al., "Surface flashover of solid insulators in atmospheric air and in vacuum", Published by AIP Publishing, Jul. 1, 1985.

A.L.Musatov et al., "A Compact X-ray tube with a Field Emitter based on carbon Nanotubes", published in Journal of Communications Technology and Electronics, vol. 32, No. 6, 2007.

Antonio Carlos M. De Queiroz, "Electrostatic Machines", published at http://www.coe.ufrj.br/acmq/electrostatic.html, Last updated on Mar. 23, 2015.

Brady Gall et al., "Investigation of the Piezoelectric effect as a means to generate X-rays", published in IEEE Transactions on Plasma Science, vol. 41, No. 1, on Jan. 2013.

D. Shiffler et al., "Carbon velvet field-emission cathode", Published by AIP Publishing, Published on Dec. 2002.

Ezzat G. Bakhoum, "Novel miniature electrostatic generator", published in Review of Scientific Instruments 79, published online on Jan. 10, 2008.

J.M.Wetzer et al., "HV Design of Vacuum Components", published in IEEE Transactions on Dielectrics and Electrical Insulation, vol. 2, No. 2, on Apr. 1995.

John G. Trump et al., "A Compact Pressure-Insulated Electrostatic X-Ray Generator", published on Massachusetts Institute of technology, Cambridge, Massachusetts, Published on Jun. 15, 1939.

Marcio Luis Ferreira Nascimento, "Brief History of X-ray tube patents", published in www.elsevier.com/locate/worpatin, 2014.

Noel J. Felici, "Generateur Felici", published at http://lyonel.baum.pagesperso-orange.fr/felici.html, published on 1960.

Sanborn F. Philp, "The Vacuum-Insulated, Varying Capacitance Machine", published in Electrical Insulation, IEEE Transactions on (Vol. EI-12, Issue:2), Published on Apr. 1977.

* cited by examiner

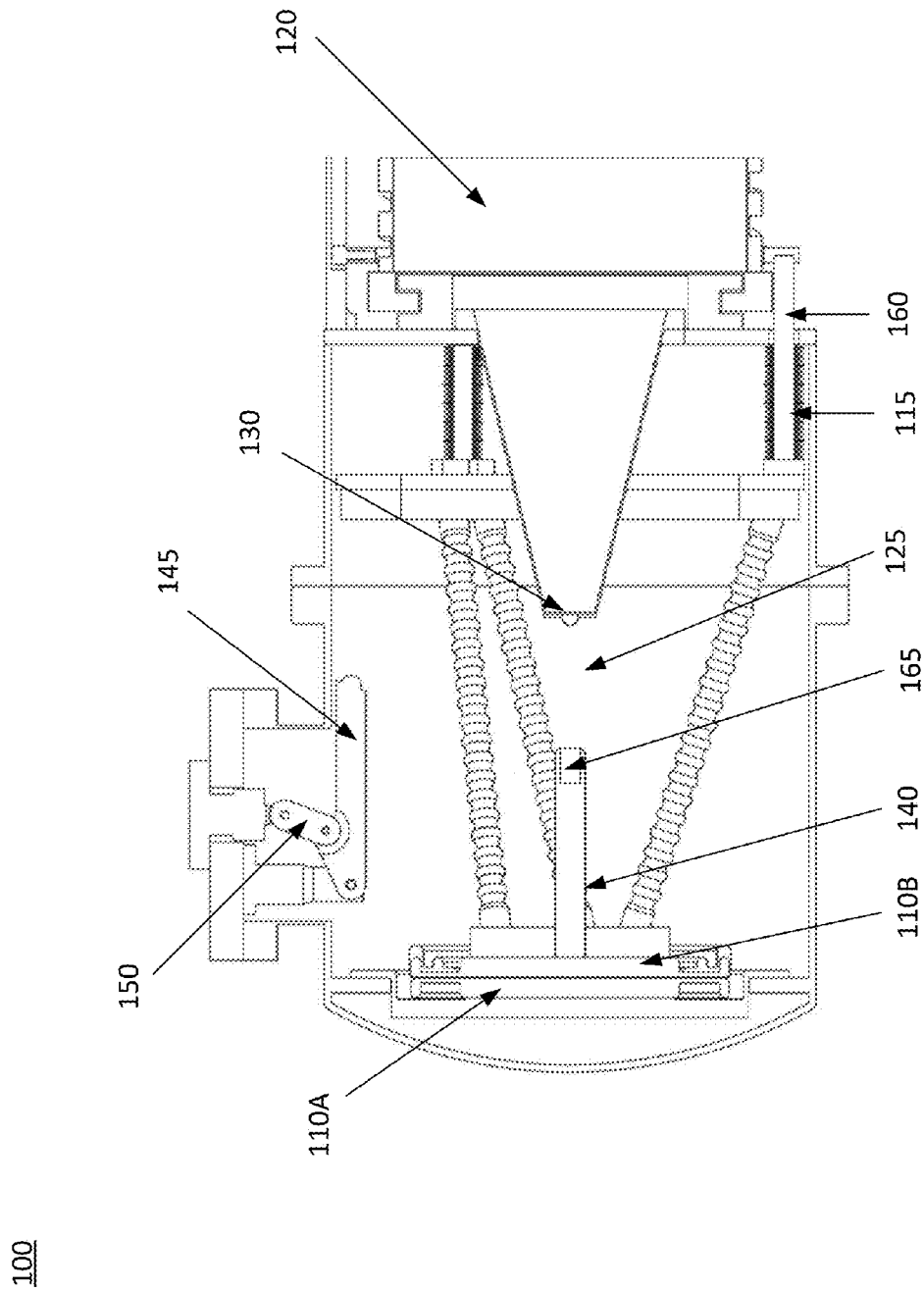

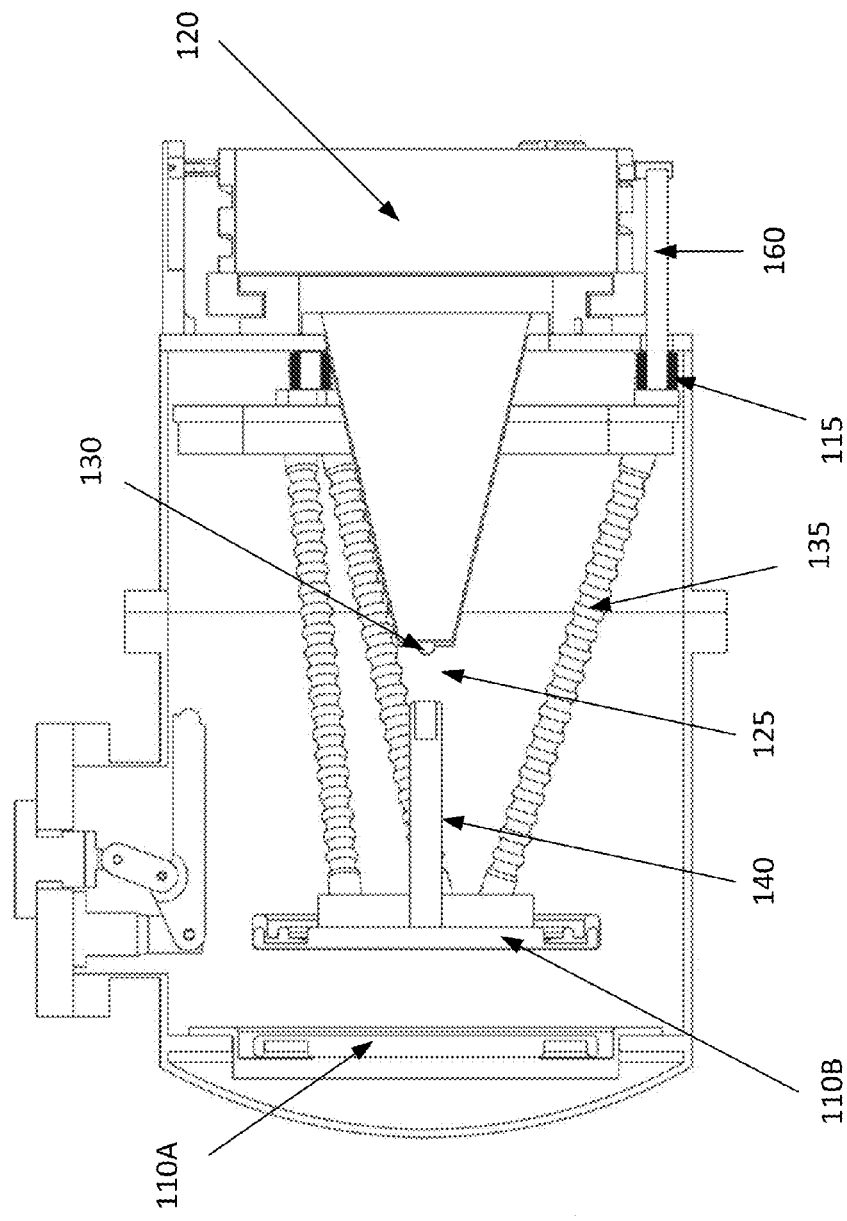

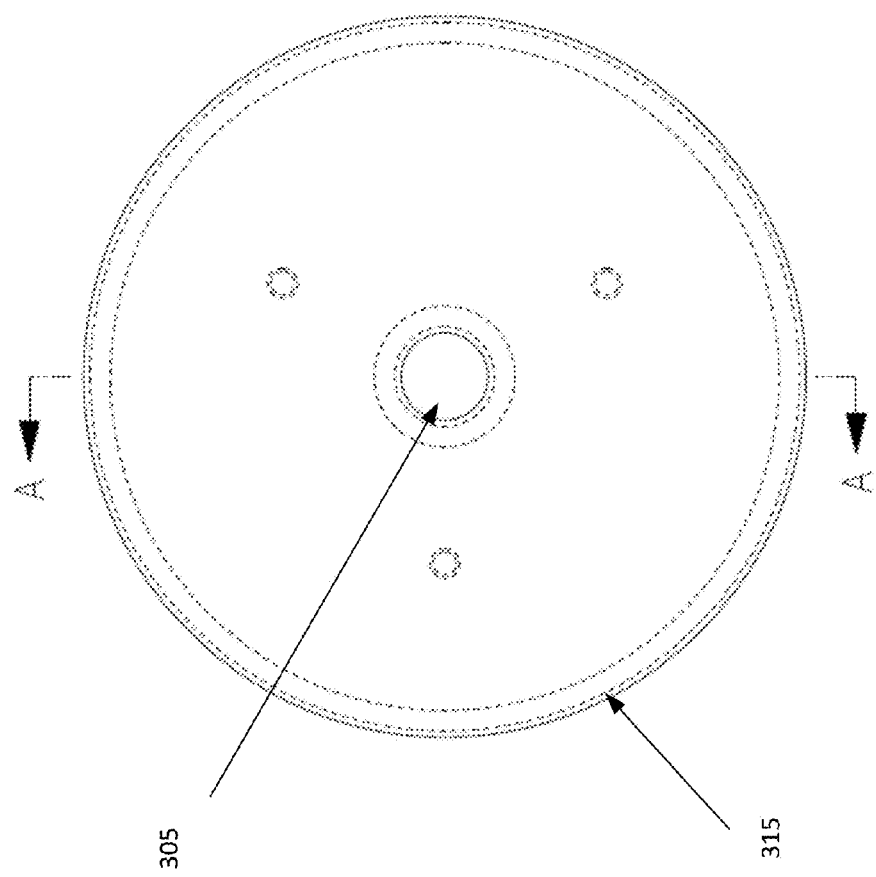

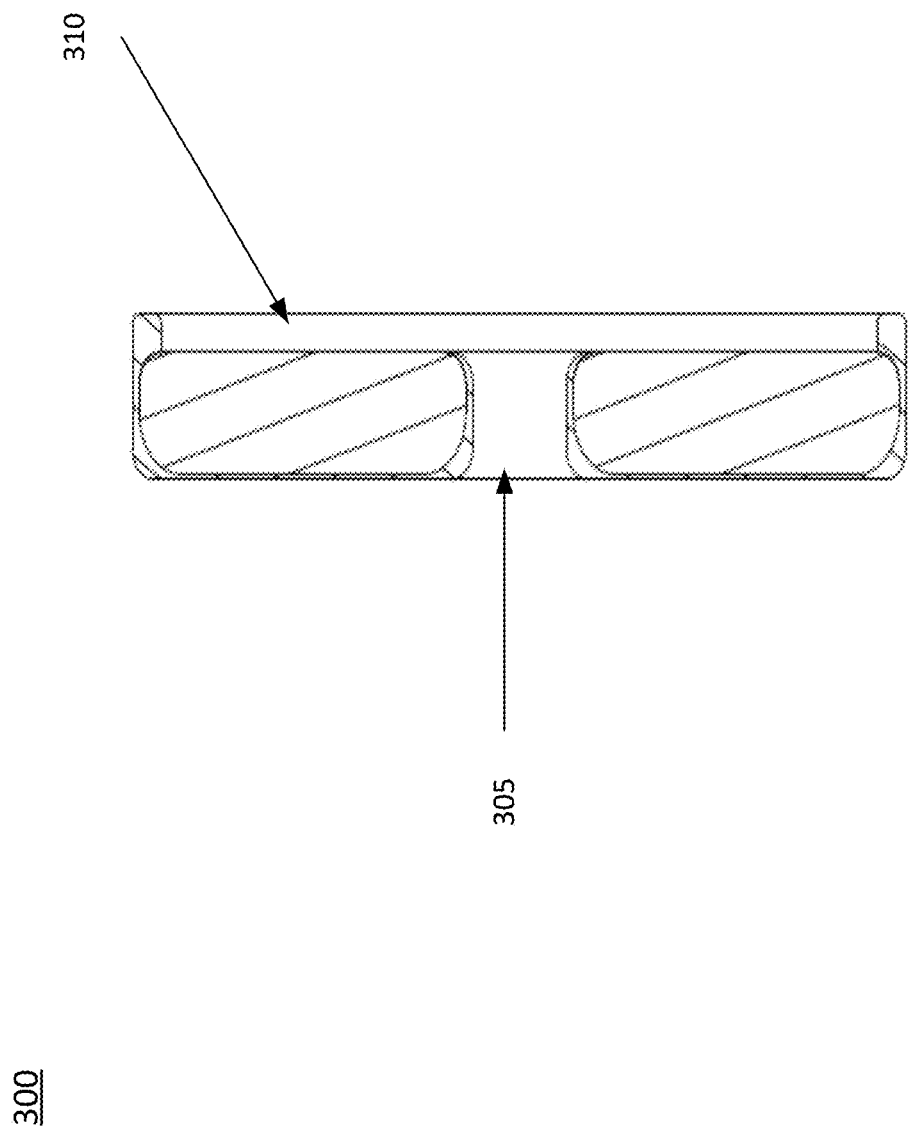

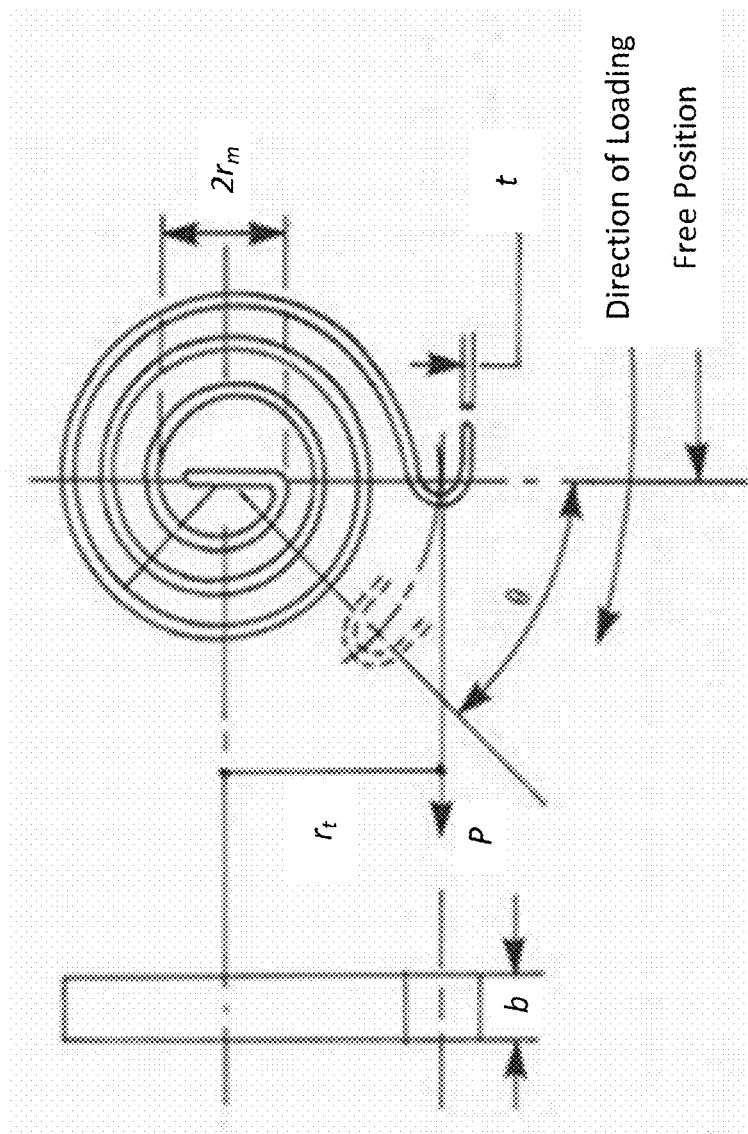

1200

1300

US 9,330,878 B2

ELECTROMECHANICAL X-RAY GENERATOR

CROSS REFERENCE TO RELATED APPLICATION

This application claims the benefit of U.S. Provisional Application Ser. No. 62/013,743, filed on Jun. 18, 2014. The subject matter of this earlier filed provisional patent application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to a compact, lightweight, high-energy, electrostatic generator and, more particularly, to an electromechanical x-ray (MEXRAY) generator.

BACKGROUND

A high voltage source and a vacuum are generally required to generate x-rays. Electrons are accelerated from a cathode, across a gap in the vacuum, to an anode at high voltage, where they collide with a heavy metal target, and release bremsstrahlung photons with a distribution of frequencies in the x-ray spectrum. There are two conventional ways to create these high voltages—transformers and influence machines (e.g., static electricity machines). Transformers are historically preferred due to their relatively compact size and wide availability.

Static electricity machines are generally not preferred to generate high voltage due to the size of the machine. For example, in a static electricity machine, a high voltage is generated in air and then transferred into a vacuum tube. Thus, an alternative approach for generating the high voltage in a vacuum may be beneficial.

SUMMARY

Certain embodiments of the present invention may provide solutions to problems and needs in the art that have not yet been fully identified, appreciated, or solved by conventional x-ray generators. For example, some embodiments of the present invention pertain to a MEXRAY generator that includes capacitor plates with variable spacing. The capacitor plates may be charged to a predefined, high-voltage and then separated to generate a much higher voltage on the order of hundreds of kV to several MV present at an anode-cathode (AK) gap. In such embodiments, the high voltage may be generated in a compact vacuum tube, which differs from conventional static electricity machines, which are insulated with air or compressed gas.

In one embodiment, an apparatus includes a vacuum tube configured to generate high voltage electrons or high voltage ions. The vacuum tube includes a high voltage source that may charge a pair of capacitor plates to a predefined voltage. The pair of capacitor plates may include a first plate and a second plate. The first plate and second may produce a higher voltage over an AK gap than the predefined voltage, when the distance between the first plate and the second plate increases.

In another embodiment, an electro-mechanical x-ray generator includes a pair of capacitor plates that may be charged to a predefined voltage. The pair of capacitor plates may achieve a charge separation generating a higher voltage than the predefined voltage when the first plate and the second plate are separated from each other. The higher voltage may be generated in a vacuum.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures:

FIGS. 1A-1D illustrates a MEXRAY generator, according to an embodiment of the present invention.

FIGS. 3A and 3B illustrate a front view and a side view of a capacitor plate, according to an embodiment of the present invention.

FIG. 4 illustrates a torsion spring, according to an embodiment of the present invention.

DETAILED DESCRIPTION OF THE EMBODIMENTS

Embodiments of the present invention pertain to MEXRAY generator. For example, the MEXRAY generator may include a power source configured to charge capacitor plates to a predefined voltage. The power source can then be disconnected and the plates may then be mechanically separated to produce a much higher voltage across the AK gap.

The MEXRAY generator has the ability to achieve high-voltage operation with favorable energy-weight scaling. For example, in conventional systems, when oil or other dielectrics are used, the volume and weight of such systems scale nearly as the cube of the voltage. With the MEXRAY generator, however, the volume and weight scale linearly or quadratically with the voltage. This reduction in size and weight allows man-portable x-ray machines to be utilized, dramatically increasing the overall utility for applications like weld inspection, cargo inspection, and remote medicine. Furthermore, because simple, lightweight components are used, the manufacturing and maintenance costs of such a generator are also reduced.

FIGS. 1A-1D illustrates a MEXRAY generator 100, according to an embodiment of the present invention. In some embodiments, MEXRAY generator 100 may utilize a small, ~2 Watt, sugar-cube-scale, high-voltage, DC-to-DC converter to charge parallel-plate capacitors 110A and 110B up to ~20 kV. The principle of charge separation is utilized to create much higher voltages up to 2 MV in an AK gap 125 to generate x-rays.

In this embodiment, MEXRAY generator 100 includes a vacuum tube (or vessel) 105. Vacuum tube 105 is made of stainless steel in some embodiments. In other embodiments, vacuum tube 105 may be made of glass, aluminum, or any other material composition that would be readily appreciated by a person of ordinary skill in the art. The exterior of vacuum tube 105 is air and the interior of vacuum tube is evacuated.

Inside of vacuum tube 105, a parallel plate capacitor includes plates 110A and 110B, which may be in contact separated by a thick dielectric. See, for example, FIGS. 1A-1C. See also FIGS. 3A and 3B. A detailed description of FIGS. 3A and 3B is provided below. In this embodiment, plates 110A, 110B are constructed inside a vacuum chamber rather than in air, which is an essential difference over conventional methods. Also, in certain embodiments, plate 110A may be stationary while plate 110B is non-stationary, i.e., plate 110B may separate from plate 110A. Alternatively, both plates may move in a "push-pull" geometry with capacitor plates charged positively and negatively with respect to ground potential. For example, in some embodiments, both plates 110A, 110B would be insulated, and one plate would be charged positively, and the other plate would be charged negatively. Plate 110B in certain embodiments may include a cathode (or emitter) 165, allowing breakdown of electrons to occur.

Figure 1A:
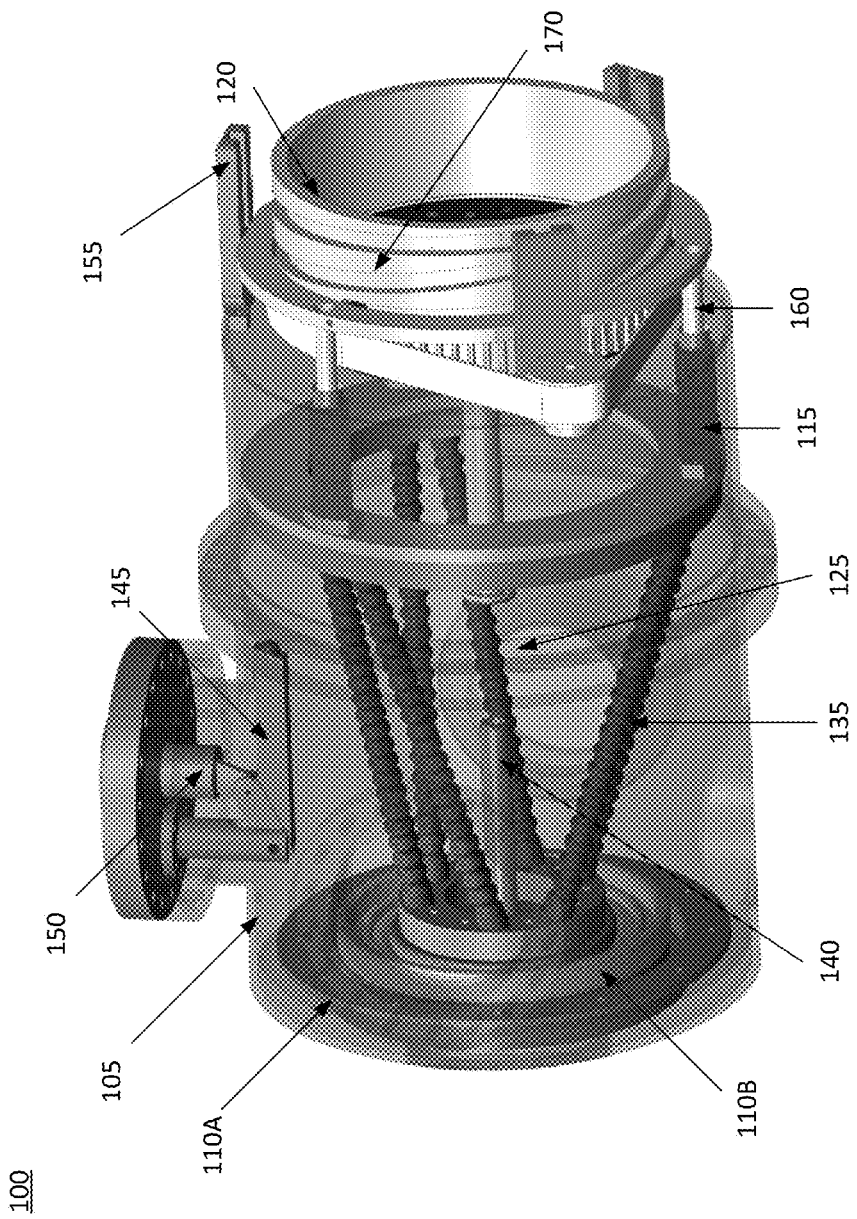
Figure 1B:
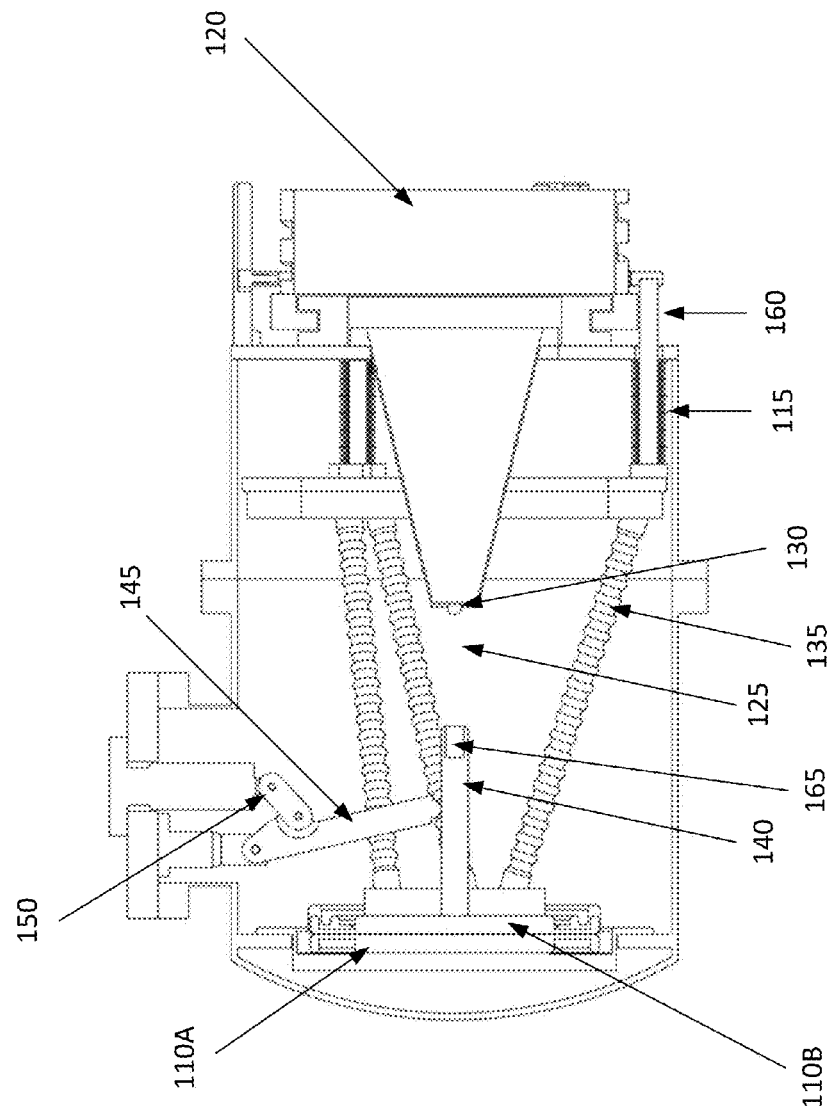

Also, in this embodiment, plate 110B may be charged to a predefined voltage via a discontinuous contactor (or a charging circuit) 145. For example, as shown in FIG. 1B, discontinuous contactor 145 may contact conducting emitter stalk 140 to charge plate 110B to a predefined voltage. In some embodiments, an actuator 150 may place discontinuous contactor 145 in contact with emitter stalk 140. When plate 110B is charged to the predefined voltage, actuator 150 may retract discontinuous contactor 145, such that discontinuous contactor 145 is no longer in contact with emitter stalk 140. This is shown in, for example, FIG. 1C.

Depending on the configuration of MEXRAY generator 100, plates 110A and 110B may be charged to any suitable voltage. When the charge reaches the predefined voltage, a mechanical cam wheel (hereinafter, "cam") 120 may increase the separation between plates 110A and 110B to significantly increase the voltage on the order of hundreds of kV or to several MV. For example, in some embodiments, cam 120 may be mechanically connected to drive rods 160, which are connected to pistons 115. These pistons 115 may be vacuum-bellows sealed in certain embodiments. As cam 120 begins to turn, drive rods 160 begin to move pistons 115, and moving pistons 115 cause plate 110B to separate from plate 110A, resulting in a decreased AK gap 125. A detailed description of cam 120 will be provided below with respect to FIG. 4. It should also be appreciated that pistons 115 may compress, as shown in FIG. 1D, when plate 110B separates from plate 110A.

As the voltage increases, AK gap 125 between plate 110B and anode 130 decreases. See, for example, FIG. 1D, which shows separation between plates 110A and 110B. The significant increase in voltage causes electrons to accelerate across AK gap 125, and collide with an anode (or target) 130 to create x-rays via conventional bremsstrahlung. AK gap 125 in this embodiment is the space between emitter (or cathode) 165 and anode 130. See also FIGS. 1B-1D. Emitter 165 may include a carbon nanotube, carbon velvet, or any other suitable cold-cathode material. In some embodiments, carbon emitters exhibit high strength, high electrical conductivity, low chemical reactivity, low vacuum outgassing, and hair-like shape suitable for local electric field enhancement.

As plate 110B increases in voltage, plate 110B tends to break down to ground, which is vacuum tube 105 in certain embodiments. For this reason, vacuum tube 105 includes insulators 135 to isolate plate 110B to ground, i.e., physically support the high voltage of plate 110B. In some embodiments, insulators 135 may be posts and may be stiff, i.e., does not bend. The profile of insulators 135 in some embodiments help to isolate surface avalanche breakdown (to a given segment), and also shield the insulator material from stray, high-energy electrons, and ionizing radiation. Also, in this embodiment, insulators 135 are connected with plate 110B. As a result, when plate 110B moves, i.e., separates from plate 110A, insulators 135 move in conjunction with plate 110B.

In some embodiments, vacuum tube 105 may include one or more stabilizing posts 155. See, for example, FIG. 1A. These stabilizing posts 155 may constrain cam 120 to act in one direction only.

With MEXRAY generator, several advantages may exist. For example, the use of vacuum instead of oil as a dielectric, saves weight. Another example, the use of mechanical high-voltage generation rather than step up transformer, use of stainless steel instead of glass as the vacuum tube, self-shielding operator from x-ray radiation, the ability to convert mechanical work into x-rays reduces need for and size of battery pack, ease of repair, ease of adjusting dose rate, and a higher x-ray energy. The electro-mechanical energy conversion efficiency is also very high, e.g., close to 100 percent efficient.

To illustrate the concept in practical terms, the following fundamental equations in this approach are described below. Starting with a parallel plate capacitor, with area A in square meters and plate gap d in meters with A>>d, we have the following relations:

$$V = \frac{Q}{C} = \vec{E}d_o \quad \text{Equation (1)}$$

where V is for voltage in Volts, Q is the charge in Coulombs, C is the capacitance in Farads, E is the electric field in Volts per meter, and d is the plate separation in meters.

The capacitance of a parallel-plate capacitor is given by:

$$C = \frac{\varepsilon_r \varepsilon_o A}{d} \quad \text{Equation (2A)}$$

For example, if the parallel plate capacitor C is $\varepsilon_r > 1$ and the plates are separated in a vacuum with $\varepsilon_r = 1$ by an additional distance $Nd_0$, then the net capacitance $C_N$ of the series combination is given by:

$$C_N = \frac{\varepsilon_r \varepsilon_0 A}{\varepsilon_r Nd_0 + d_0} \cong \frac{\varepsilon_0 A}{Nd_0} \text{ for } N\varepsilon_r \gg 1 \quad \text{Equation (2B)}$$

It should be appreciated that this situation forms a capacitive divider, where the higher voltage appears across the lower, vacuum capacitance gap. Therefore, the DC stress on the dielectric is slightly lower when the plates are pulled apart than when they are separated only by the high-dielectric material. Because the stored charge in Equation (1) is directly proportional to the capacitor's dielectric constant in Equation (2), the systems overall voltage gain can be maximized whenever a high, relative dielectric constant $\varepsilon_r$ is used.

The mechanical work W in Joules used to separate the two plates is given by:

$$W = \frac{1}{2} Q \Delta V \quad \text{Equation (3)}$$

Combining Equations (1) and (2) in differential form give the following equations:

$$\Delta V = \frac{Q \Delta d}{\varepsilon_0 A} \text{ for } \varepsilon_r = 1, \text{ and} \quad \text{Equation (4A)}$$

$$\Delta V = \frac{Q(Nd_0 \varepsilon_r - d_0)}{\varepsilon_0 \varepsilon_r A} \text{ for } \varepsilon_r > 1 \quad \text{Equation (4B)}$$

and combining Equations (3) and (4) gives the following equation:

$$W = \frac{Q^2 \Delta d}{2\varepsilon_0 A} \text{ for } \Delta \frac{d}{d_0} \gg \varepsilon_r \quad \text{Equation (5)}$$

Some embodiments are directed to maximize the stored charge while minimizing the size of the parallel plate capacitor. For this reason, the operating voltage in Equation (1) may also be maximized.

It should be noted that the 1928, Fowler-Nordheim "Law" is a continuously-evolving, set of empirical relationships that describes vacuum-emission current-density as a function of electric field E, material work-function $\phi$, and the microscopic field enhancement factor $\beta$. The scaling of the (leakage) current density is a very strong function of all three variables. In some embodiments, the reliance upon a closed-form calculation has been avoided because there are many assumptions—even with the "simplified, standard" forms (e.g., Equation (6))—to give consistently reliable results.

A basic investigation into leakage currents due to Fowler-Nordheim emission using Equation (6) was performed. For "typical" parameters (e.g., V=1 MV, d=1 cm, $\beta$=10, $\varepsilon_r$=4.5), the calculated leakage current is very low, on the order of $10^{-23}$ A/cm². It should be appreciated that one of the difficulties with these calculations is their extreme sensitivity to largely unknown parameters such as the field enhancement factor.

It should be appreciated that Fowler-Nordheim emission applies in high-vacuum conditions with polished electrodes and extremely smooth, clean surfaces. Under those special circumstances, fields as high as 1-10 GeV/m can be required for electron emission. Therefore, in order for the "contactor" diode to function properly, the contactor "foot" should operate at high fields in a Fowler-Nordheim-type regime with no emission at working field stress, e.g., less than $10^8$ V/m in some embodiments. To eliminate these concerns, the charging surface is moved in some embodiments to the side opposite the capacitor dielectric.

Conversely, the diode generally operates by abruptly turning on in a microscopically field-enhanced regime with relatively intense, space-charge limited emission. In some embodiments, the MEXRAY generator allows for routine leakage current measurement of ~1 µA. This threshold has been exceeded whenever the vacuum conditions are rough enough, the AK gap spacing is tight, and/or the carbon velvet is configured in a high-$\beta$ geometry. However, it should be noted that the charge leakage is not a significant factor even on a large, 8" diameter capacitor.

Recall the basic form of the Fowler-Nordheim current density $J_{FN}$ in A/m² in Equation (6) as a guide to expected scaling. In particular, the current density scales as the square of both the macroscopic electric field E in MV/m and the field enhancement factor $\beta$. Here $\phi$ is the material work function in eV.

$$J_{FN} = \frac{1.5 \times 10^6 \beta^2 E^2}{\phi} \exp\left[-\frac{6.8 \times 10^3 \phi^{3/2}}{\beta E}\right] \quad \text{Equation (6)}$$

Given that fact, it is reasonable to expect a rather dramatic increase in current density causing an avalanche-like breakdown as the AK gap, which governs the electric field, closes. The theory and operational practice of vacuum interrupters provides some guidance for this situation. It has been suggested the following rule-of-thumb can be used to obtain the "critical" electric field $E_{crit}$ for the onset of field-emission, current discharge:

$$\beta E_{crit} < 10^{10} \text{ V/m} \quad \text{Equation (7)}$$

Since the electric fields on both sides of the capacitor can be up to 100 MV/m, the controlling factor for field emission in MEXRAY generator is the field enhancement factor $\beta$, in some embodiments. We note that for $\beta$=1, the critical field may be 100 MV/m in some embodiments.

Figure 2:
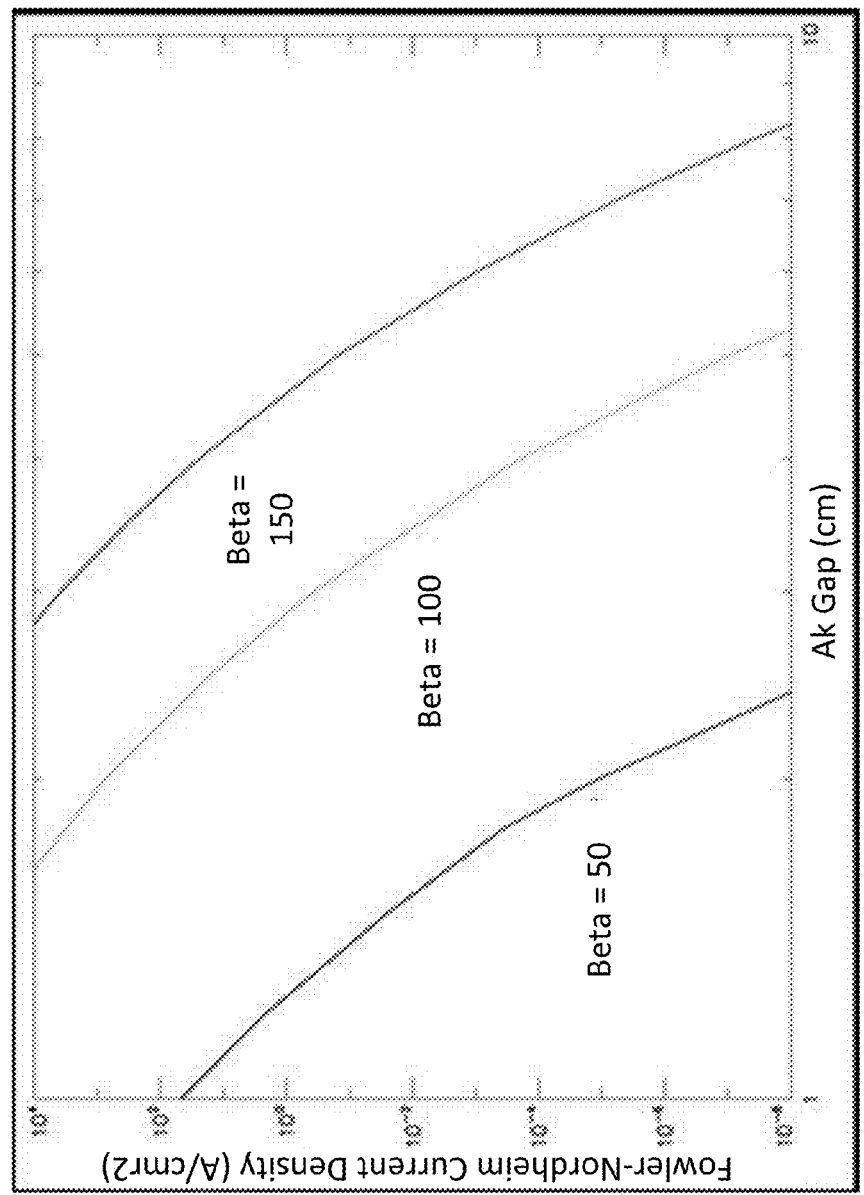
FIG. 2 is a graph illustrating a Fowler-Nordheim current-density at voltage of 1 MV for a range of field enhancement factors 13 and AK gaps, according to an embodiment of the present invention.

In FIG. 2, for example, a graph 200 illustrating the Fowler-Nordheim current-density at voltage of 1 MV for a range of field enhancement factors $\beta$ and AK gaps is shown. Based upon this study, the AK gaps that are used may be between 2 cm and 5 cm at this voltage.

To satisfy the high voltage electrical power requirements, MEXRAY generator may include a compact, "sugar-cube" style, DC power supply with a source impedance of 25 MΩ. This source impedance charging a 1 nF capacitance of the plate gives a charging time constant $\tau$=RC=25 ms. A high-voltage connection wire between the power supply and the charging contactor may include a specialized configuration, e.g., a 40 kV, Tensolite-Carlisle, double-wrapped Kapton™ wire may be used in some embodiments.

Another consideration is the peak force required to separate the capacitor plates. This force is given by the Lorentz force law:

$$\vec{F}=Q[\vec{E}+(\vec{v}\otimes\vec{B})]=Q\vec{E} \quad \text{Equation (8)}$$

In some embodiments, $Q=10$ μC and $E=10$ keV/$5\times10^{-4}$ m$=20$ MV/m$=>F=200$ Newtons or about 40 pounds. By combining Equations (1), (2), and (8), the force can be rewritten in more convenient terms in the following relation:

$$\vec{F} = \varepsilon_0\varepsilon_r A\frac{V^2}{d^2} \quad \text{Equation (9)}$$

It should be appreciated that the required force may be proportional to the applied voltage squared. As a practical limit, V/d is limited by the breakdown strength of the dielectric. Furthermore, the electric field may be greater in the vacuum than in the dielectric material. This situation may require a discontinuous force to be applied initially with the smaller force necessary to break the vacuum gap, and a force that is larger by the ratio of the relative dielectrics to be applied thereafter. This discontinuous force can be readily accommodated by shaping the grooves in the cam. See, for example, grooves 170 in cam 120 of FIG. 1A.

It is also prudent to consider the electrical shock hazard associated with devices of this type. For example, the stored energy U may be calculated from the following equation:

$$U = \frac{1}{2}CV^2 \quad \text{Equation (10)}$$

The stored energy in the tube capacitance is maximized, for example, when the voltage is highest. This value is nearly identical to the mechanical work performed—differing only slightly by the electrical energy supplied to initially charge the capacitor.

In some embodiments, the dielectric for the capacitor plate may be corona resistant (CR) Kapton™. This dielectric may exhibit a breakdown strength of order 100 kV/mm. The dielectric sheet may be bonded to aluminum capacitor plates using adhesive in some embodiments. This adhesive may have a low viscosity making it suitable for thin <50 μm joints. The adhesive may also exhibit high strength, high electrical resistance, a high dielectric constant ($\varepsilon_r\sim3.5$) and low outgassing. It should be appreciated that the adhesive provides a strong bond over the entire surface to ensure that the dielectric sheet does not pull away from the capacitor plate whenever the plates are separated.

In another embodiment, a vacuum-potted, 2-part epoxy dielectric may be used. The first part may be Epon, 815-C, a biphenol-A and N-butyl glycidyl-ether resin. The second part may be Versamid-140, polyamide resin. This epoxy may have a dielectric constant of $\varepsilon_r\sim3.5$ in some embodiment, and a breakdown strength greater than 1 kV/mil. This material may be mixed 50%-50% by weight on a laboratory scale, and vacuum-potted, to reduce bubbles by boiling for 15 minutes under vacuum. The assembly may be potted and placed under 100 psig air-pressure, and may be allowed to cure for 24 hours to further reduce the size of any entrained bubbles. The assembly may then be heat-cured for several hours at 65 degree C. in a gravity convection oven to increase the cross-linking strength of the epoxy.

A Valspar, silicon-wax mold-release may be used in certain embodiments. This mold release may have a carcinogenic, methylene chloride component that acts as a solvent for the silicon wax. The entire surface of the mold may be coated while maintaining a clean, metal surface to bond with the epoxy. Finally, the anode plate was back-machined to the 0.5-1 mm thick, nominal dimension and polished with ordinary acrylic polish on a lathe. See, for example, FIGS. 3A and 3B, which illustrate front view and a side view of a capacitor plate 300, according to an embodiment of the present invention. In some embodiment, capacitor plate 300 may be a vacuum-potted, epoxy coated, aluminum capacitor plate. Capacitor plate 300 may include a hole 305 in the center to allow a cathode (or emitter) to be inserted through. Capacitor plate 300 may also include a dielectric rim 310 to limit the surface tracking of insulator.

The assembly of capacitor plate 300 may be conditioned at increasingly higher voltages (e.g. 20 kV in some embodiments) with a charge voltage at $<10^{-4}$ mBar gauge pressure. The limiting breakdown includes surface tracking 315 around the capacitor edges, and not through the dielectric. In separate embodiments, the assembly may have a longer track length and a thick, low-capacitance "ear" to eliminate this surface breakdown path. See, for example, FIGS. 3A and 3B.

In some embodiment, the charging foot protruding through the capacitor (cathode) surface may be eliminated, and the dielectric material may be placed on the cathode, rather than the anode.

Returning to Equations (1) and (2), for a fixed "size" or capacitor area A, the capacitance may be governed by the relative dielectric strength $\varepsilon_r$ and the minimum plate gap $d_{min}$. Furthermore, for a given dielectric, the minimum plate gap $d_{min}$ is determined by the dielectric breakdown strength of the dielectric material. Thus, in some embodiments, a convenient figure-of-merit for capacitors is the product of the relative dielectric constant and the dielectric breakdown strength. Materials with a higher product potentially result in a more compact design and vis-versa.

TABLE 1

Properties of Candidate Dielectrics

| Material | $\varepsilon_r$ | Volume Resistivity (Ω-cm) | Dielectric Strength (kV/mm) | DC Vacuum Flashover (kV/mm) | Machineable | Vacuum | ρ (g/cc) | Manufacture |
|---|---|---|---|---|---|---|---|---|
| Kapton | 3.5 | >$10^{17}$ | >100 | | No | Yes | 1.4 | DuPont |
| Epoxy | 4.0 | >$10^{16*}$ | >40 | | Yes | Yes | 1.8 | |
| Macor | 6 | >$10^{16}$ | >60 | >10 | Yes | Yes | 2.5 | Corning |
| Mycalex | 7 | >$10^{14}$ | >15 | | Yes | Yes | 2.6 | Pro Plastics |
| Alumina | 9.5 | >$10^{14}$ | >30 | >5 | No | Yes | 4.0 | Coors |
| Vacuum | 1.0 | N/A | >1000 | N/A | Yes | Yes | 0.0 | N/A |

TABLE 1-continued

Properties of Candidate Dielectrics

| Material | $\epsilon_r$ | Volume Resistivity ($\Omega$-cm) | Dielectric Strength (kV/mm) | DC Vacuum Flashover (kV/mm) | Machineable | Vacuum | $\rho$ (g/cc) | Manufacture |
|---|---|---|---|---|---|---|---|---|
| Glass Ceramic | 35 | ? | >80 | ? | No | Yes | ? | Schott |

It should be appreciated that the loss associated with the volume resistivity of the dielectric should be considered. To avoid bleeding charge off the capacitor dielectric, or along the insulator stack, the bulk material resistivity should be >$10^{13}$ and >$10^{12}$ $\Omega$-cm, respectively, in certain embodiments. Properties of common candidate insulators and dielectrics are shown in Table 1 above.

In theory, the insulator standoff spacing, drives the size of the generator more than any other parameter. In some embodiments, at 1 MV, at least a 20 cm insulator spacing may be used assuming uniform field-grading. Tapered, segmented insulator designs may increase this DC holdoff by a factor of 2 or more.

Clean, non-segmented, non-corrugated, Macor insulators may have a vacuum DC flashover of approximately 150 kV/cm. Because Macor insulators can be machined and glued, Macor may be more attractive than pure ceramics such as alumina.

The exact shape of an insulator may have a strong effect on flashover performance. The simplest shape, a right-circular-cylinder, may have a lower standoff voltage than more complex shapes, e.g., a corrugated cylinder. To the extent that one end of the insulator is larger than the other end, the cathode side may be the larger in DC designs. Furthermore, it has been reported that a slight, inward, chamfer on the cathode side of the insulator may significantly improve the flashover threshold to more than 100 kV per cm (pulsed). So long as damage thresholds are not exceeded during the discharge process, high-voltage conditioning may further increase flashover voltage.

Generally, the surface flashover probability increases with the duration of the applied field. Therefore, the DC case is usually taken as the limiting case. While pulsed fields may decrease the probability of surface flashover, as a general rule pulse durations of more than 1 ms are similar to DC. Therefore, a DC flashover point may be implemented in some embodiments.

With respect to the vacuum vessel, it should be appreciated that the size of the vacuum vessel may be the largest driver of the overall system weight, and therefore, the diameter and thickness may be minimized. In some embodiments, the cylindrical walls may have a substantial margin when applied to spherical systems. Consequently, a 0.0625 inch thick, stainless wall may be more than adequate on a 6" diameter sphere in some embodiments. The weight of such a sphere may be calculated from:

$$w = \frac{4\rho\pi}{3}(r_{outer}^3 - r_{inner}^3) \quad \text{Equation (11)}$$

FIG. 4 illustrates a torsion spring 400, according to an embodiment of the present invention. In certain embodiments, torsion spring 500 may be a simple, wind-up torsion mainspring. This allows a user to wind up torsion spring 400, and does not require a motor assembly.

A torsional spring rate is given by:

$$\frac{\text{torque}}{\theta} = \frac{\Gamma}{\theta} = \frac{bt^3Y}{12L_t} \quad \text{Equation (12)}$$

where b is the spring width, t is the spring's metal thickness, Y is Young's modulus for the spring material, and $L_t$ is the length of the spring active material. Torsion spring 400 may have a volume of about 50 cc and a weight of about 1 pound to make torsion spring about the same size and weight of a hand-held drill battery, but with user-supplied "energy".

Given $\theta=2\pi$ radians per wind-turn, and assuming a typical (r~2 cm) spring might have a 15-turn wind, then the amount of energy stored by such a spring is >10 Joules. Thus, the MEXRAY generator may include a torsion spring 400, which may be desirable for applications requiring a small number of pulses, or where power is precluded (e.g., underwater applications).

Figure 5:
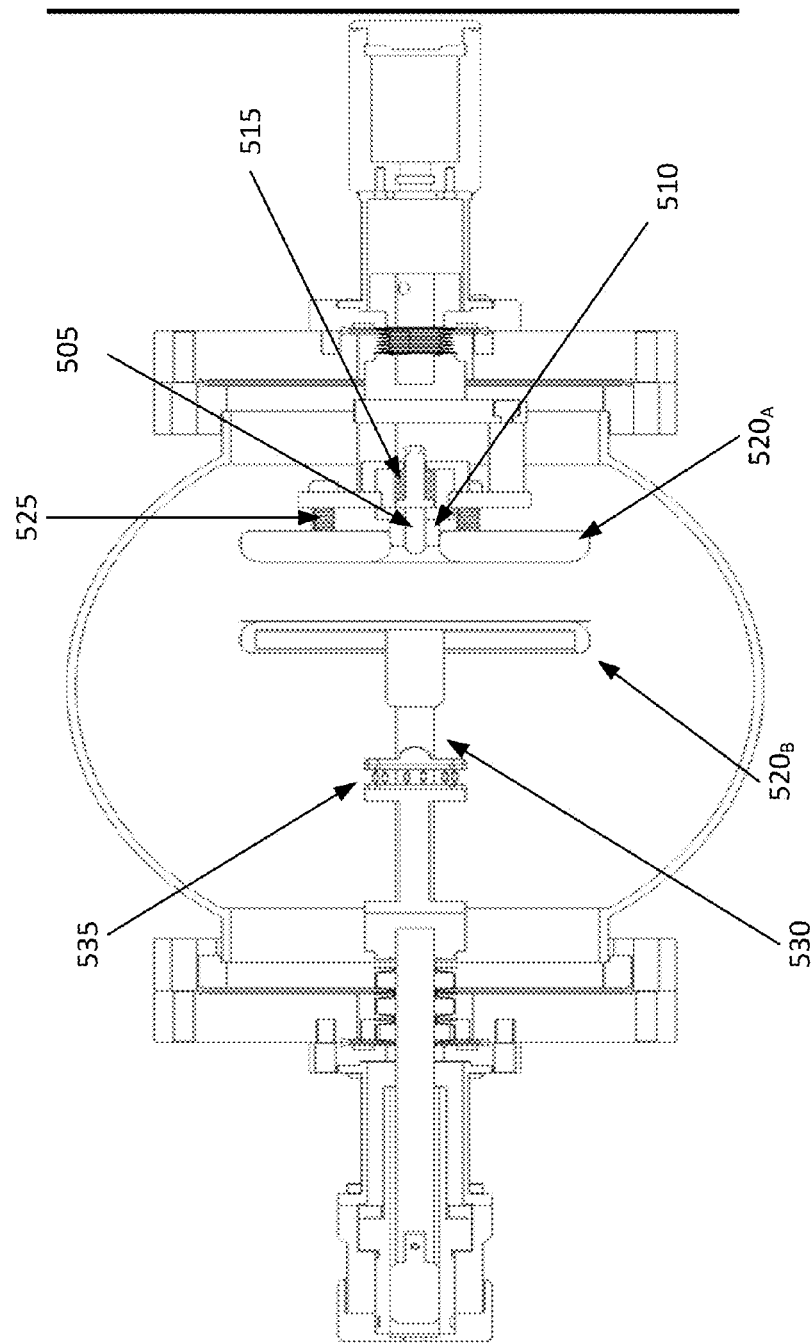
FIG. 5 illustrates a MEXRAY test chamber, according to an embodiment of the present invention.

FIG. 5 illustrates a MEXRAY test chamber 500, according to an embodiment of the present invention. In some embodiment, MEXRAY test chamber may be a stainless steel test chamber capable of testing up to 600 kV with diagnostic ports for: cathode current, visible light, x-ray dose, and radiographic diagnostics along with vacuum pumping.

In this embodiment, x-ray generator 500 includes a charging contactor. The charging contactor includes a charging pin 505 surrounded by an insulator 510. Electromechanical x-ray generator 500 may also have similar components to those described above with respect to electromechanical x-ray generator 100 of FIG. 1. For example, electromechanical x-ray generator 500 may also include an emitter, insulator, a target, etc.

To create a high voltage, a multi-step process may be executed by the components within the electro-mechanical generator 500. For example, an actuator may allow a first plate $520_A$ and second plate $520_B$ to make contact. Next, contact between second plate $520_B$ and charging pin 505 is made. Because charging pin 505 is spring loaded 515, contact between second plate $5205_B$ and charging pin 505 can be realized.

After charging pin 505 makes contact with second plate $520_B$, second plate $520_B$ is charged to a predefined voltage. It should be appreciated that in some embodiments first plate $520_A$ may include a plate (not shown) configured to hold first plate $520_A$ and second plate $520_B$ together. The plate within first plate $520_A$ may also be spring loaded (e.g., springs 525). This allows first plate $520_A$ and second plate $520_B$ to remain in contact, separated only by a thin dielectric material thereby increasing the stored charge. Upon reaching the predefined voltage, charging pin 505 is retracted from second plate $520_B$, and first plate $520_A$ and second plate $520_B$ begin to separate.

For example, spring 515 causes charging pin 505 to be retracted from second plate 520$_B$.

As first plate 520$_A$ and second plate 520$_B$ are separated by, for example, a cam actuator, the predefined voltage is dramatically increased to a much higher voltage causing the electrons to accelerate across AK gap 530. In other words, the high voltage from the separation causes the cathode to emit and transport electrons across the AK gap 530 to create x-rays. This process is repeated for a predefined number of times.

Figure 6:
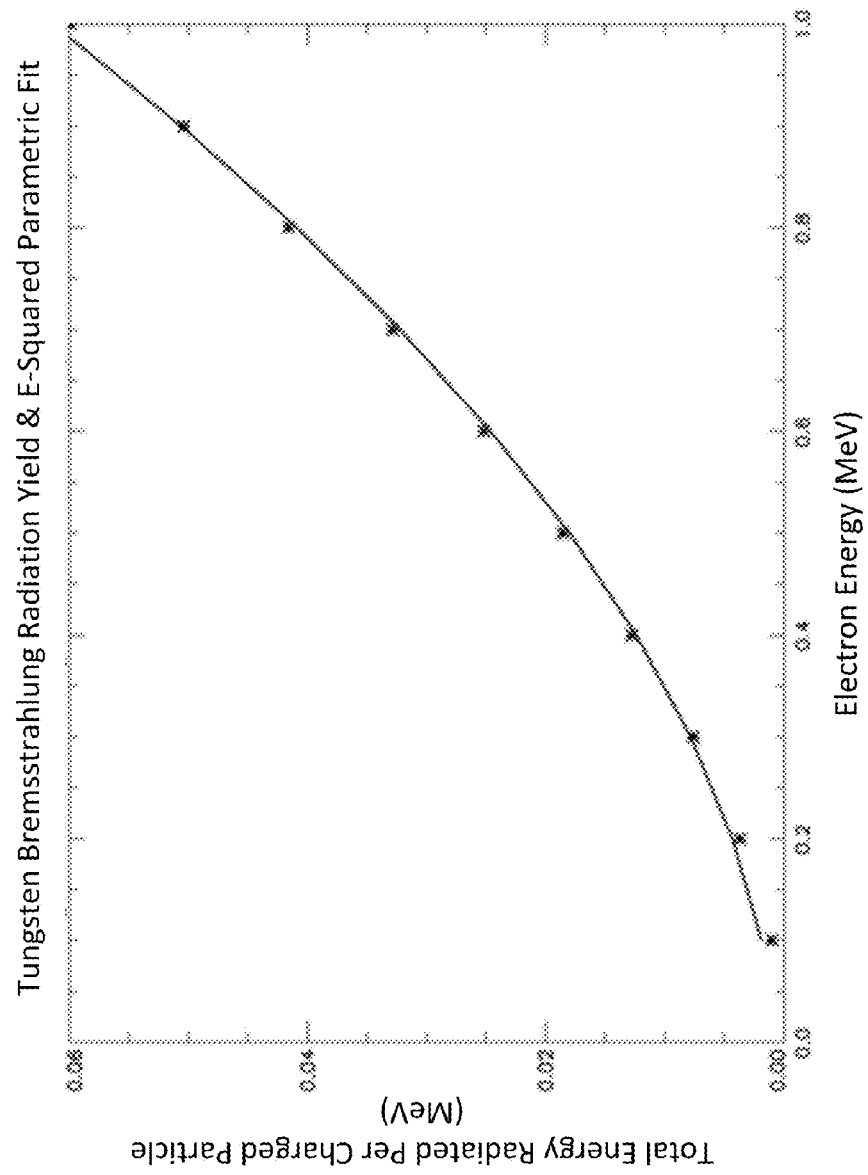
FIG. 6 is a graph illustrating a tabulated bremsstrahlung radiation yield for tungsten targets, according to an embodiment of the present invention.
Figure 7:
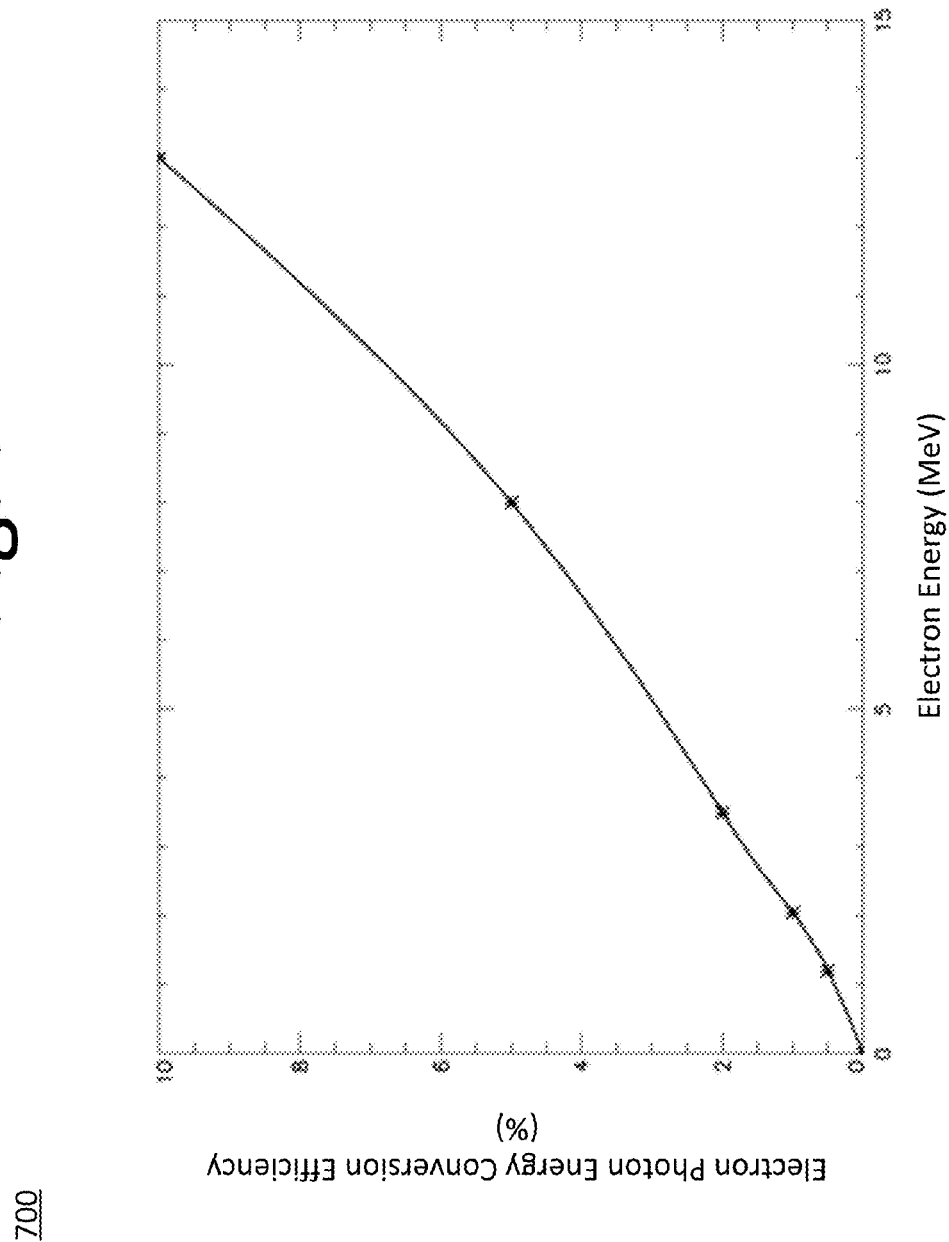
FIG. 7 is a graph illustrating dose efficiency scaling data versus electron energy, according to an embodiment of the present invention.

FIG. 6 is a graph 600 illustrating a tabulated bremsstrahlung radiation yield for tungsten targets, according to an embodiment of the present invention. For example, graph 600 emphasizes that electron energy is strong scaling parameter for dose production. In graph 600, the total energy radiated per electron into $4\pi$ steradians is given by the product of the electron's energy and the tabulated radiation yield for that target material and energy. For on-axis radiation production efficiency data from tantalum targets for a much wider range of electron energies (0-15 MeV), e.g., FIG. 7, which is a graph 700 illustrating dose efficiency scaling data versus electron energy, according to an embodiment of the present invention. As the electron energy becomes highly relativistic, the radiation pattern is no longer isotropic into $4\pi$, but forward-directed in the direction of electron flow. Consequently, at higher energies, the on-axis efficiency of the bremsstrahlung process increases.

In some embodiments, the dose per pulse, D, is proportional to the product of the capacitor charge Q, the initial capacitor charge voltage $V_0$, and the total capacitor separation distance $\Delta d$ raised to some power x, where $2.0 < x < 3.0$ depending on the end-point energy.

$$D = kQ\left(\frac{V_0 \Delta d}{d_0}\right)^x \quad \text{Equation (13)}$$

Given that the DC, vacuum electric-field breakdown threshold $E_{max}$, in the capacitor gap is simply bounded by:

$$E_{max} > \frac{V_0}{d_0} \quad \text{Equation (14)}$$

The maximum dose is similarly bounded by:

$$D_{max} < kQ(E_{max}\Delta d)^x \quad \text{Equation (15)}$$

Given that $Q = V_0 C_0$, we then have:

$$D_{max} < \frac{kV_0 \varepsilon_0 \varepsilon_r A (E_{max}\Delta d)^x}{d_0} \quad \text{Equation (16)}$$

The constant of proportionality k has been evaluated for (multi-) megavolt sources as $k = 1.7 \times 10^3$, and the exponential scaling is such that $x = 2.7$. For capacitor area A in square meters, the initial charge voltage $V_0$ expressed in Volts, the initial capacitor gap $d_0$, the final capacitor gap $\Delta d$ in meters, and the electric field breakdown threshold $E_{max}$ in MV/m. Using this methodology, the dose in Roentgens at 1 m from an optimal thickness target is approximately bounded by:

$$D_{max} < \frac{1700 V_0 \varepsilon_0 \varepsilon_r A (E_{max}\Delta d)^{2.65}}{d_0} = 1700 Q V_{Final}^{2.65} \quad \text{Equation (17)}$$

where $V_{Final}$ is the final voltage on the capacitor after separation, and Q is the initial (and final) charge. In some embodiments, the linear scaling of dose with capacitor area A, relative dielectric constant $\varepsilon_r$, and the nearly cubic scaling of dose with the breakdown threshold $E_{max}$. It is clear from Equation (17) that the maximum breakdown strength drives the dose more than any other parameter.

Because MEXRAY generator uses vacuum as a dielectric and a charge separation as a mechanism for generating high voltage, the MEXRAY generator excels at making high energy electrons. Thus, the electro-mechanical technique is well-suited for taking advantage of this rapid, energy-scaling behavior.

At 3 MVp, MEXRAY generator may generate approximately 270 mR/μC at 1 foot. Since this dose is more effective at penetrating steel and other high-Z targets, the net radiographic efficacy is even more substantial depending on the radiographic object involved.

Figure 8:
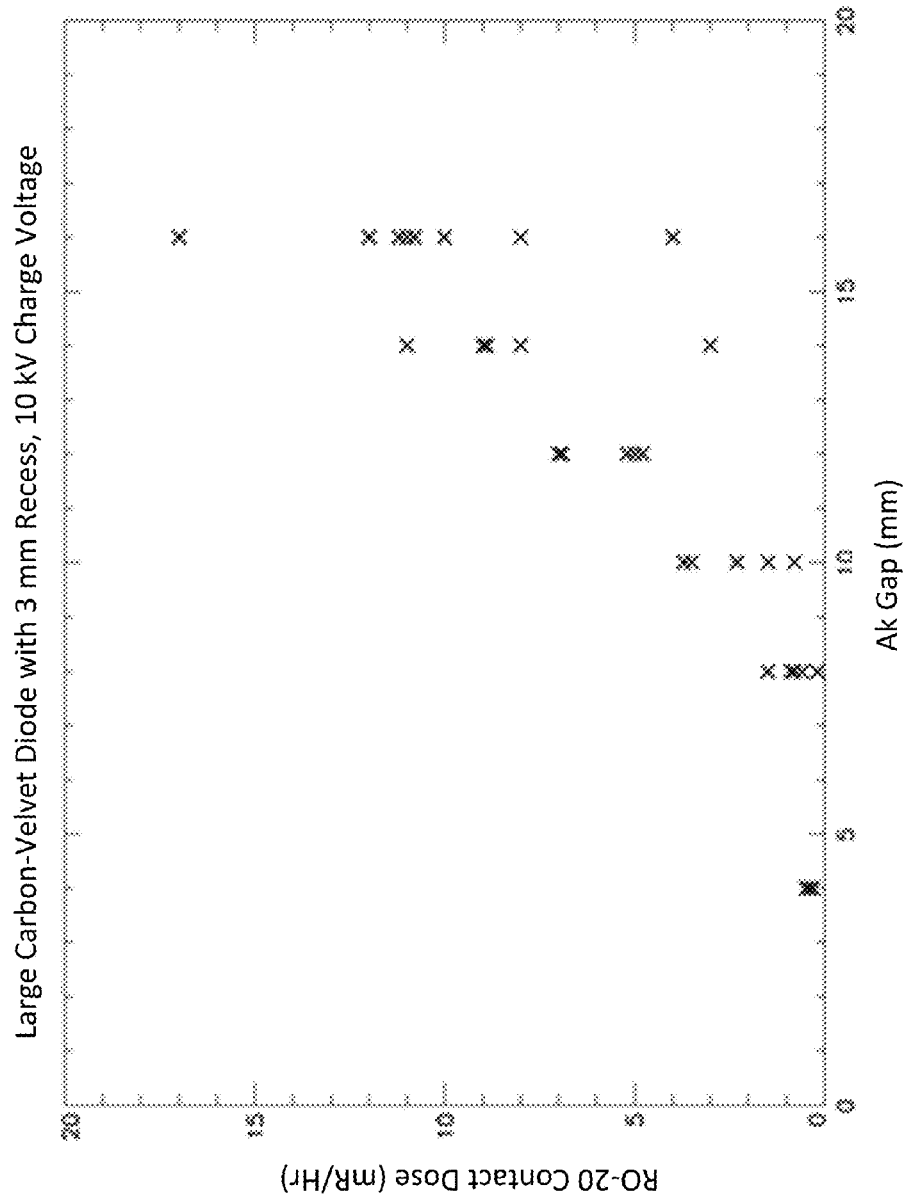
FIG. 8 is a graph illustrating dose scaling with AK spacing gap, according to an embodiment of the present invention.

Preliminary data taken by varying the AK gap (energy) of the electromechanical tube is shown in FIG. 8, which shows a graph 800 illustrating dose scaling with AK spacing gap, according to an embodiment of the present invention. Since no vacuum environment is free from contamination, there is a continuous flux of surface contaminants deposited onto—and carried off of—the emitter surface. This flux of absorbed and desorbed contaminants may result in wide fluctuations of the emission current on both short and long time scales. This particular data set, as shown in FIG. 8, may require tight vacuum conditions of around $10^{-4}$ mBar-gauge. Assuming that the rate of molecular deposition onto a clean surface may be proportional to the pressure, the firing rate of such a cathode surface may well be limited by the gas transfer to-and-from the cathode surface.

Figure 9:
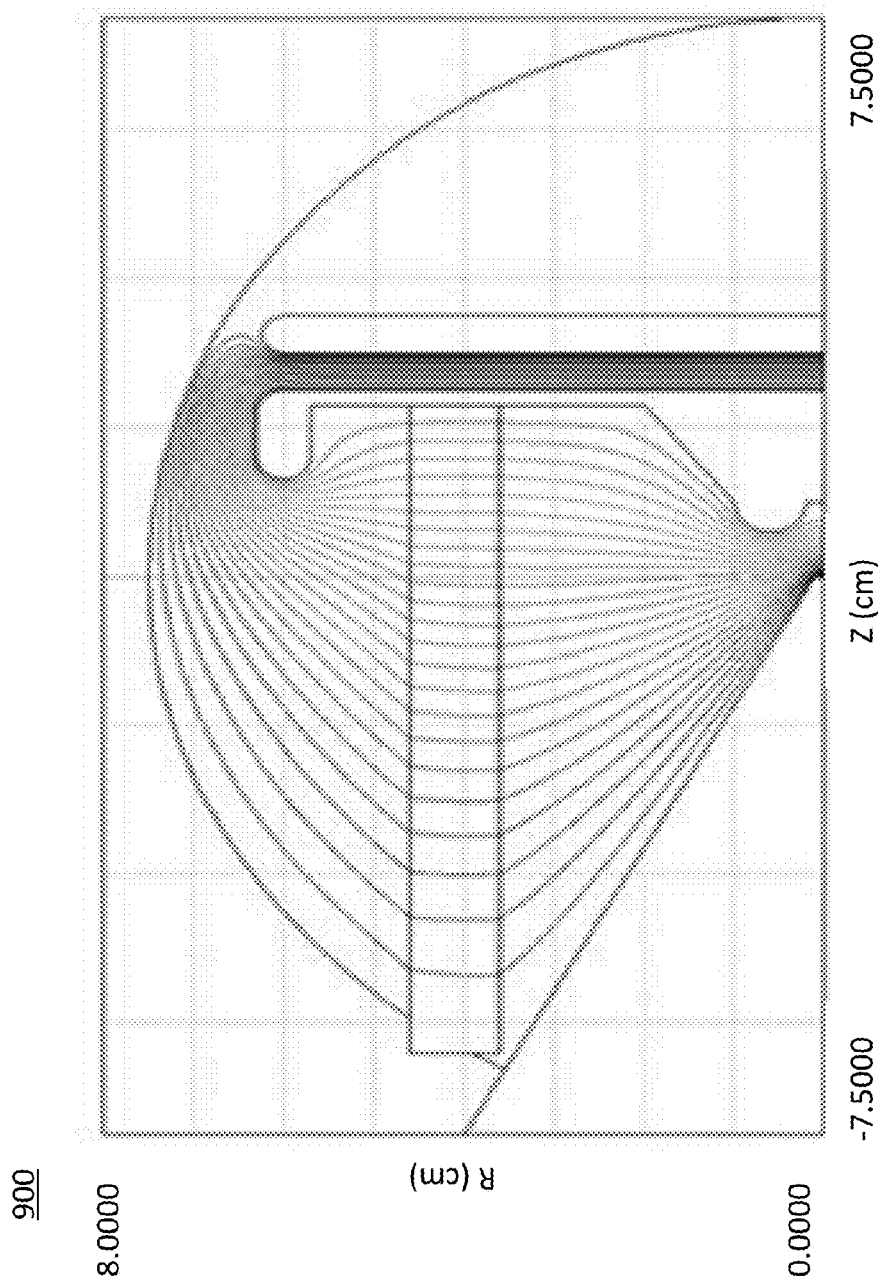
FIG. 9 is a graph illustrating relative uniform field grading being achieved on the insulator without resorting to metal segments.

To gain insight into the overall design limitations and insulator grading, electrostatic field calculations were performed on a 6" diameter, spherical diode design at a diode voltage of 500 kV. These calculations included an anode cone, a Macor insulator, a 4.75" diameter capacitor, and a Pierce diode. Several physical considerations were implicit in this design. An x-ray converter may be located at the center of the sphere to allow the sphere to be used as a natural gimbal without changing the source location. FIG. 9 is a graph 900 illustrating relative uniform field grading being achieved on the insulator without resorting to metal segments. For example, at 500 kV operation, the peak field stress in the insulator was less than 20 kV/mm, which is well below the DC dielectric strength of both Macor and Alumina.

Figure 10:
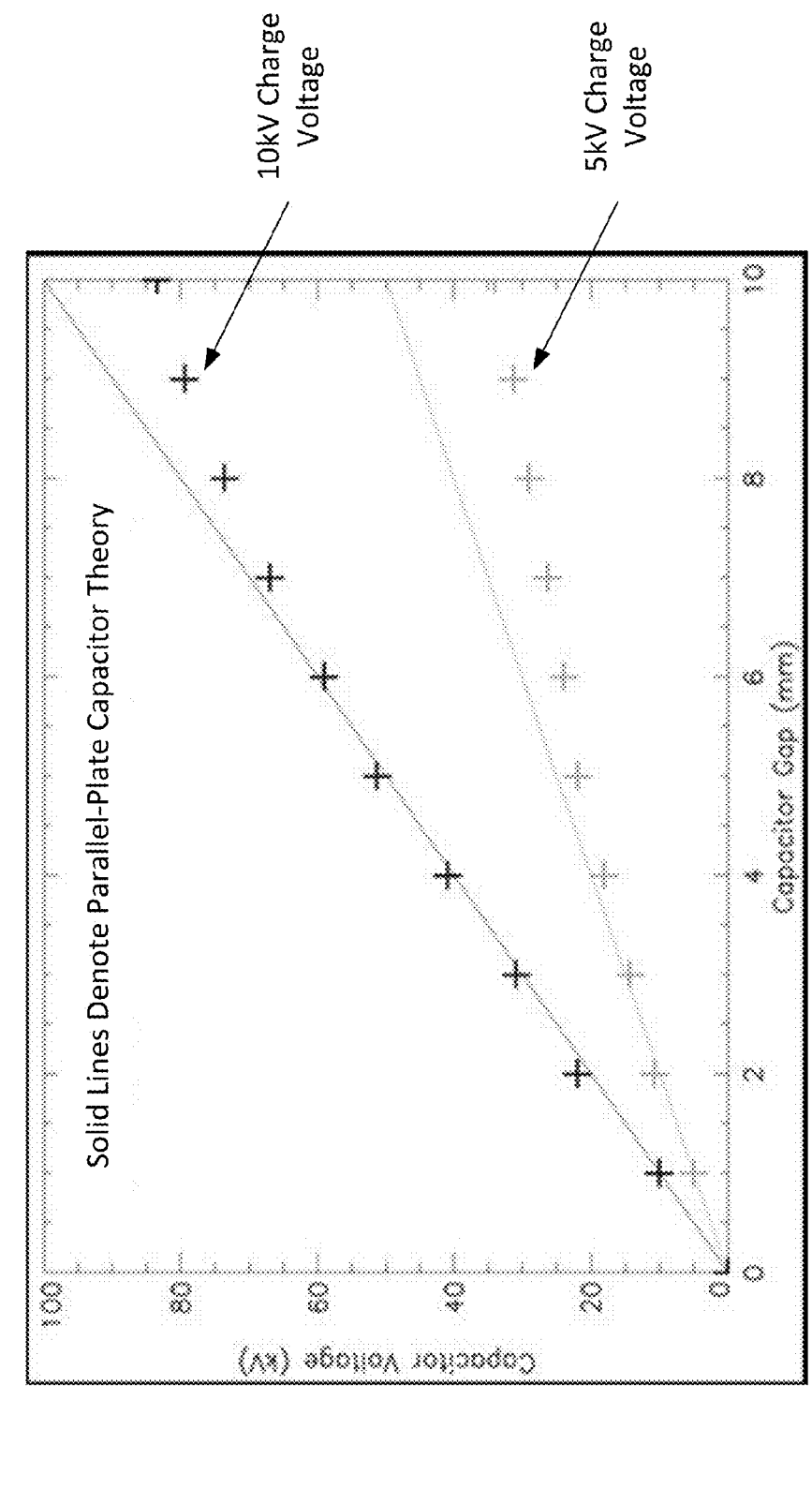
FIG. 10 is a graph illustrating results of the voltage multiplication test, according to an embodiment of the present invention.

Because it may be difficult to determine the performance of these mechanical systems, i.e., how long will they hold a charge and what is the real voltage multiplication, an extremely high-impedance (>100 GΩ), non-contact, vacuum, electrostatic field measurement diagnostic approach may be developed. This may be based upon an electrostatic voltmeter and a circular, end-viewing probe. The probe in this embodiment may be TORR-sealed into the vacuum chamber and tie-wrapped onto the Macor insulator rods. Using this configuration, absolute voltage multiplication, and also charge leakage, may be tested. See, for example, FIG. 10, which is a graph 1000 illustrating results of the voltage multiplication test, according to an embodiment of the present invention.

Graph 1000 shows that for a wide range of capacitor gaps where the cathode voltage does multiply according to the parallel-plate capacitor theory developed in Equations (1) to (4). Higher test voltages were not obtained to reduce the chance of probe damage from insulator breakdown. Deviations from the theoretical behavior (e.g., the solid lines) are explained by the fact that as the capacitor separation gap becomes the same order as the capacitor radius, the simple theory is inadequate to describe the behavior of the actual measurement geometry. Therefore, in some embodiments, gaps exceeding a value of ~⅓ in diameter may no longer be considered as a simple parallel plate.

Despite the presence of a carbon-velvet cathode, no charge leakage was observed at any of the voltages obtained indicating leakage currents well below 1 μA. This lack of charge leakage is important because it means that actuator frequencies on the order of 1 Hz are reasonable. This low frequency operational mode reduces the stress on, and size of, the high-voltage charging supplies as well as the power required by the actuator mechanism.

Figure 11:
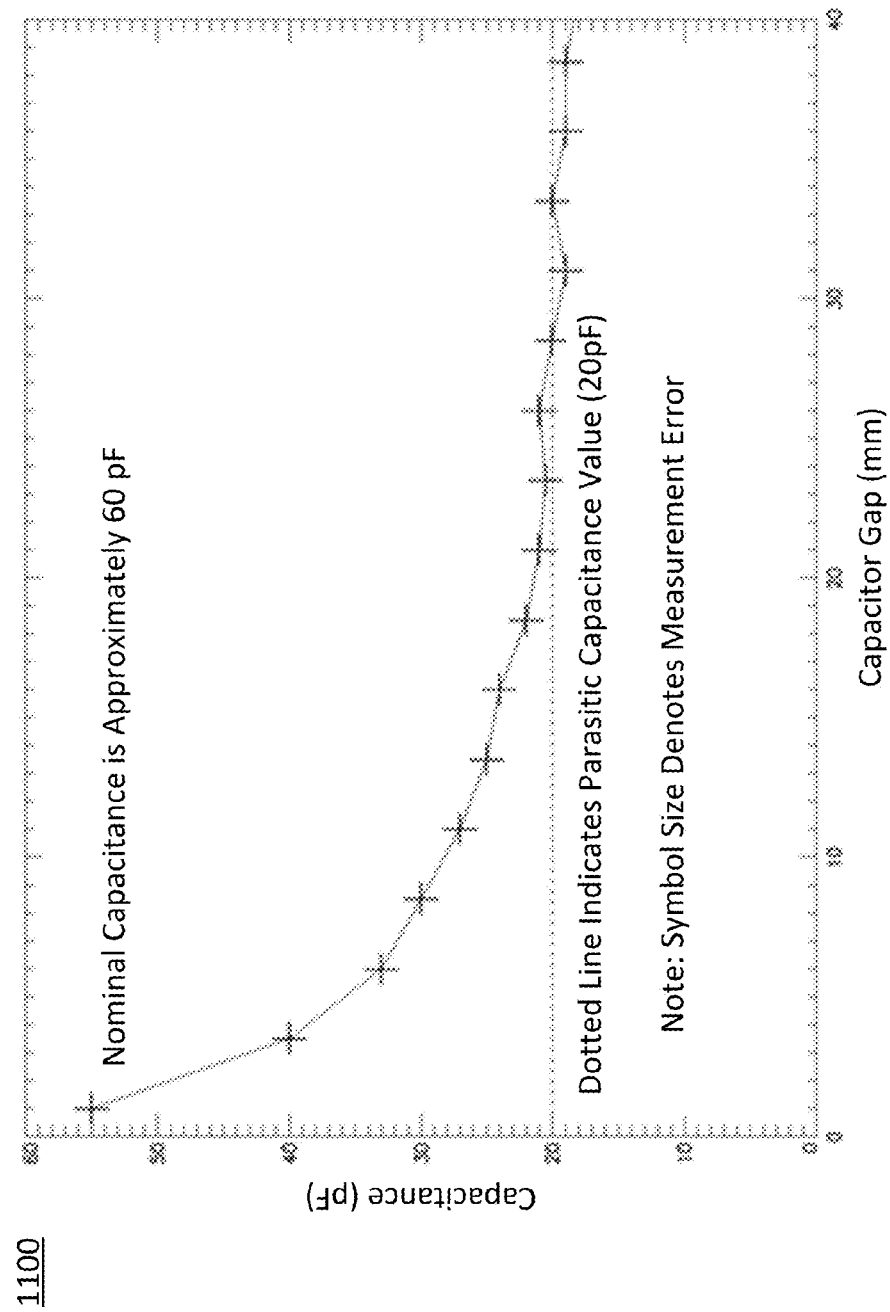
FIG. 11 is a graph illustrating test results for a 9" diameter vacuum chamber parasitic capacitance $C_p$, according to an embodiment of the present invention.

To test the parasitic capacitance of a 9″ diameter vacuum chamber, for example, a series of capacitor measurements were plotted vs. capacitor gap. See, for example, graph 1100 of FIG. 11. The probe capacitance of approximately 2 pF was nulled out in these measurements. The asymptotic value approached for large gaps is the parasitic capacitance value—in this geometry about $C_p \sim 20$ pF. While other chambers as large as 12″ in diameter were tested, the lowest parasitic capacitance that could be achieved was $C_p \sim 15$ pF. Therefore, in certain embodiments, the minimum capacitance that can be achieved should be limited to 10-20 pF. This implies that a 1 MV system, which may require a voltage multiplication of 50 for 20 kV charge, should have an initial capacitance in excess of 1 nF.

The relatively high parasitic capacitance of $C_p = 20$ pF may be a fundamental limit for this configuration. Nonetheless, voltage multiplications of a factor of 3-8 were achieved in these tests.

Figure 12:
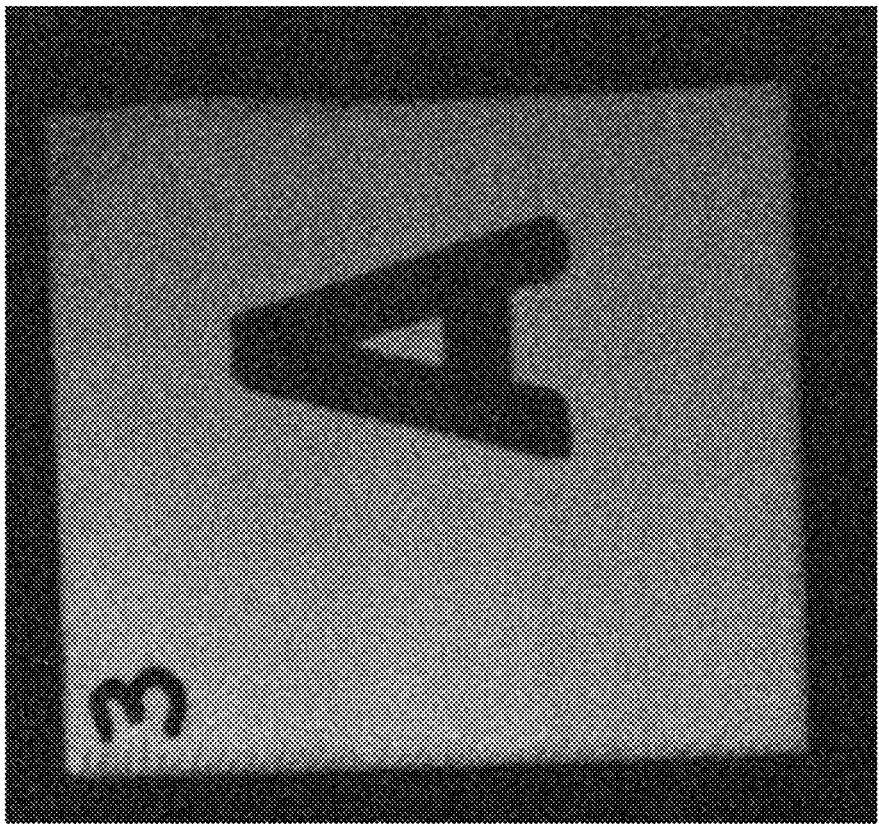
FIG. 12 illustrates a radiograph of lead "A" using a small coupon of BaFBr phosphor, according to an embodiment of the present invention.

FIG. 12 illustrates a radiograph 1200 of lead "A" using a small coupon of BaFBr phosphor, according to an embodiment of the present invention. This radiograph demonstrates that the MEXRAY generator generates x-rays. This may be the first radiograph ever taken with a mechanically generated x-ray system. Because the initial system had insufficient energy to penetrate the walls of the vacuum chamber, as shown by graph 1000 of FIG. 10, this radiograph was setup inside the chamber and then removed to be scanned. The number "3" is written on the phosphor in ink and was not part of the radiograph. See, for example, FIG. 12.

Since the evaluation of capacitance of arbitrary, 3D geometric conductors using numerical integration of Poisson's equation remains an active research area, three simplified geometries were evaluated with closed form solutions to estimate parasitic capacitance values. These geometries were: nested conducting spheres, nested conducting cylinders, and a conducting sphere on a conducting plane. See, for example, FIGS. 13A-13C, which illustrate geometries 1300 for parasitic capacitance using Equations (18)-(20), according to an embodiment of the present invention. The most relevant geometry to the MEXRAY is the parasitic capacitance of nested spheres in vacuum given by:

$$C_p = \frac{4\pi\varepsilon_0 r_o r_i}{r_o - r_i} = \frac{4\pi\varepsilon_o}{\left(\frac{1}{r_i} - \frac{1}{r_o}\right)} \quad \text{Equation (18)}$$

The capacitance (per unit length) of concentric cylinders is given by for length L>>r:

$$C_p = \frac{2\pi\varepsilon_0}{\ln\left(\frac{r_o}{r_i}\right)} \quad \text{Equation (19)}$$

The capacitance of a conducting sphere of radius r to an infinite conducting plane at a distance h in vacuum is approximately:

$$C_p \cong 4\pi\varepsilon_0 r\left(1 + \frac{1}{2}\log\left(1 + \frac{r}{h}\right)\right) \quad \text{Equation (20)}$$

Equation (20), for example, represents the minimum parasitic capacitance that may be achieved even when the vacuum vessel are constructed with non-conducting materials—namely about 100 pF per meter (radius). Also, for a thin disk capacitor of radius r at a distance h (with a vacuum dielectric $\in_r=1$) from an infinite conducting plane, the capacitance is given approximately by:

$$C_p \cong \frac{4\pi\varepsilon_o r}{\tan^{-1}\left(\frac{4h}{r}\right)} \quad \text{Equation (21A)}$$

and alternatively, $$Cp \cong \frac{\pi r^2 \varepsilon_o}{h}\left[1 + \frac{2h}{\pi r}\left(\ln\left(\frac{r}{h}\right) + 1.9\frac{h}{r} + 3.2\right)\right] \quad \text{Equation (21B)}$$

With a 9″ diameter plate and a 2″ separation in some embodiments, $C_p$ in Equation (21A) results in 11 pF and $C_p$ in Equation (21B) results in 16 pF. The measured value in the vacuum container is $C_p = 17$ pF+/−5 pF, which is a conservative estimate as $C_p < 20$ pF.

Equation (18), for example, points to a fundamental system limitation due to deleterious effects of parasitic capacitance between the parallel-plate capacitor assembly and the outer case of the vacuum vessel. In one example, if capacitor "plate" is reduced to a point in a sphere (i.e., $r_i=0$), then the capacitance of the outer sphere is $C_p = 4\pi\in_0 r_0$, or about 110 pF per meter. In some embodiments, Equations (17) and (18) may represent upper limits for the parasitic capacitance value in their respective spherical, cylindrical and planar domains, while Equations (21A) and (21B) represent lower limits (due to the infinite plane assumption).

Since the parasitic capacitance $C_p$ is in parallel with the plate capacitance, the net capacitance is the sum of the two values i.e., $C_{NET} = C + C_p$, and cannot be less than the parasitic value. Therefore, the voltage multiplication may not be larger than $Q/C_p$.

Taking the spherical vacuum vessel as a canonical geometry, a critical voltage multiplication factor $M_{crit}$ may be defined as the ratio of the plate capacitance C from Equation (2) to the parasitic capacitance $C_p$ of Equation (18). That is $$M_{crit} = \frac{C}{C_p} = \frac{\varepsilon_r}{4d}\left(r_i - \frac{r_i^2}{r_o}\right) \quad \text{Equation (22)}$$

In Equation (22), for example, the critical multiplication value is proportional to the relative dielectric constant of the plate capacitor, and the capacitor radius $r_i$. Equation (22) may also be inversely proportional to the initial capacitor gap d. Furthermore, the maximum multiplication occurs when $r_o \to \infty$. If $r_o$ is a constant, finite value, the maximum multiplication occurs when $r_i = r_o/2$, and under this condition $M_{crit}$ reduces to:

$$M_{crit} = \frac{\varepsilon_r r_o}{16d} \quad \text{Equation (23)}$$

and the parasitic capacitance in Equation (18) can be reduced to:

$$C_p = 8\pi \in_0 r_0 \quad \text{Equation (24)}$$

Figure 13A:
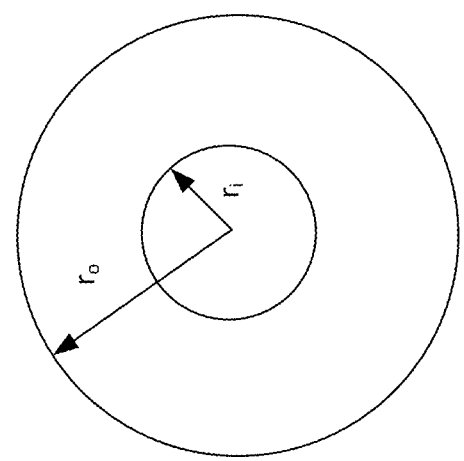
FIGS. 13A-13C illustrate geometries for parasitic capacitance using Equations (18)-(20), according to an embodiment of the present invention.
Figure 13B:
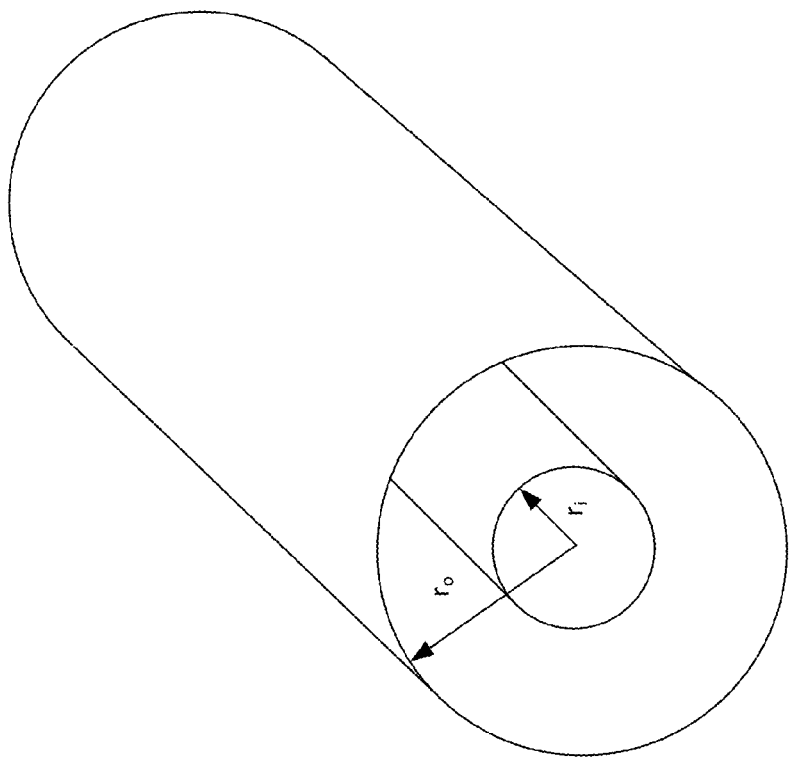
Figure 13C:
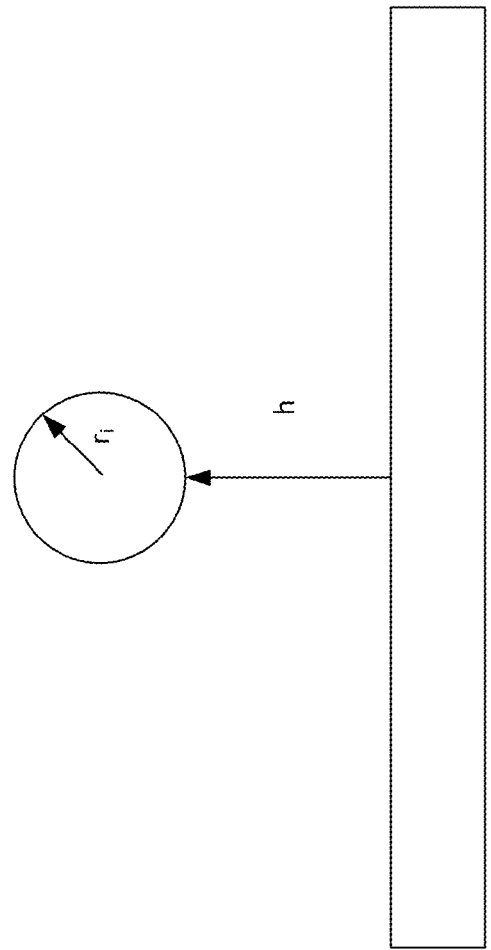

In another embodiment, the "optimal" geometry may be viewed as a series of nested, spherical shells such as those shown in FIGS. 13A-13C. Taken in that context, the best theoretical size versus voltage gain performance is achieved when the radius of the inner shell is half the radius of the outer shell.

Figure 14:
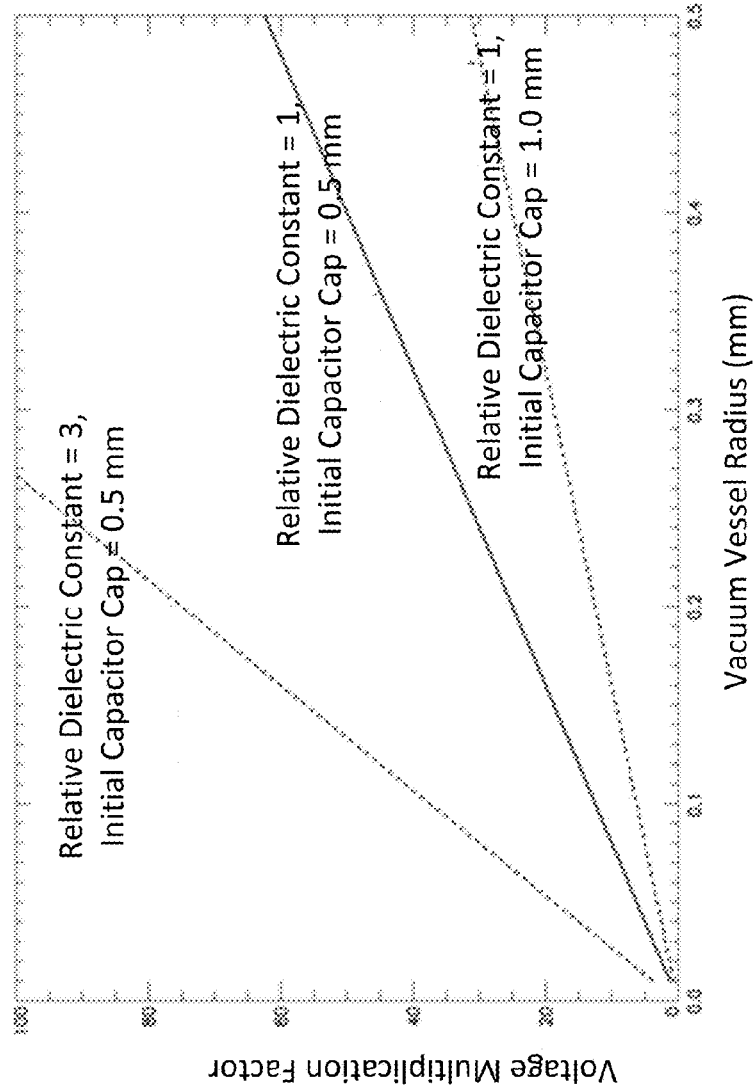
FIG. 14 is a graph illustrating the range of possible multiplication factors that are realistic under extremely conservative ($\in_r=1$, d=1 mm), nominal ($\in_r=1$, d=0.5 mm), and limiting ($\in_r=3$, d=0.5 mm) assumptions about known design parameters, according to an embodiment of the present invention.

The relative dielectric constant may be in the range from $1 < \in_r < 4$, $r_o$ may be less than 0.5 m for a man-portable system, and d may range from 0.5 mm to 1.5 mm. These conditions from Equation (22) are shown in graph 1400 of FIG. 14. FIG. 14 is a graph 1400 illustrating the range of possible multiplication factors that are realistic under extremely conservative ($\in_r=1$, d=1 mm), nominal ($\in_r=1$, d=0.5 mm), and limiting ($\in_r=3$, d=0.5 mm) assumptions about known design parameters, according to an embodiment of the present invention.

Figure 15:
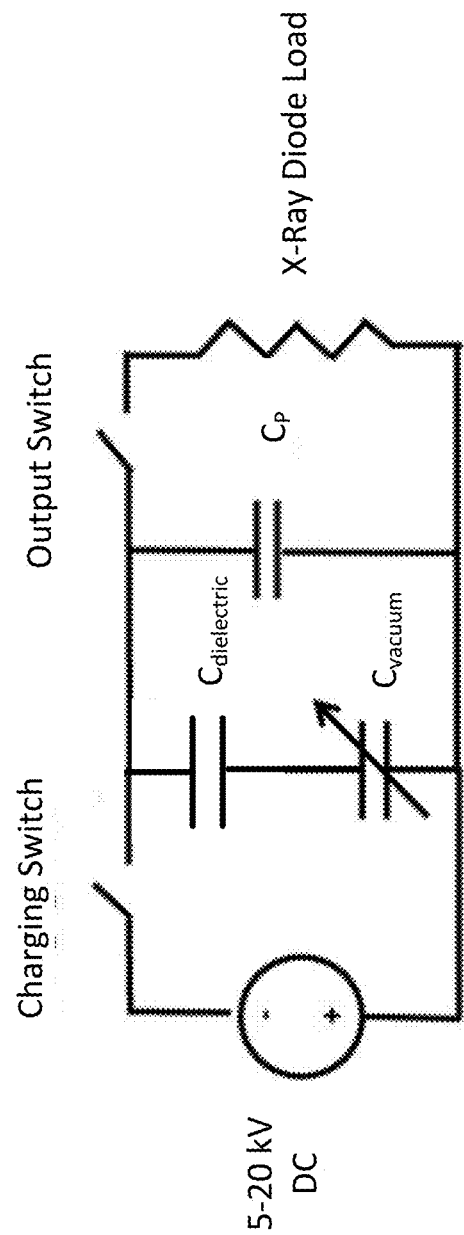
FIG. 15 is a circuit diagram illustrating a MEXRAY, according to an embodiment of the present invention.

FIG. 15 is a circuit diagram 1500 illustrating a MEXRAY, according to an embodiment of the present invention. In this embodiment, as the plate capacitor radius $r_i$, gets larger, the parasitic capacitance of the (spherical) vacuum vessel becomes larger. Consequently, there is a tradeoff between dose per pulse and system size. Simply put, the parasitic capacitance $C_p$ grows only linearly with size, while the initial parallel-plate capacitance C grows as the square of its radius. Therefore, the reduction in the net impact of parasitic capacitance, or higher voltage multiplication, favors a larger vacuum chamber.

To study this parameter space, a dose from Equation (17) is calculated assuming various values of parasitic capacitance from Equation (18), initial capacitance, charge voltage, gap size, dielectric constant, and capacitor area. In this embodiment, 3 capacitors may be present, as shown in FIG. 15. The parallel plate capacitor C is a series combination of two variable capacitors $C_{dielectric}$ and $C_{vacuum}$. It should be appreciated that those configurations with higher breakdown margins may have lower dose performance.

In summary, MEXRAY generator may include a pair of capacitor plates inside of a vacuum. The pair of capacitor plates may be charged to a predefined voltage and then separated to produce a much higher voltage in an AK gap using the principal of charge separation. Such embodiments provide several advantages over the current state of the art. For example, MEXRAY described herein may utilize a vacuum instead of oil as a dielectric (saving both weight and size) and utilize mechanical high voltage generation rather than a step-up transformer.

Because all the high voltage components reside inside the vacuum chamber, the vacuum tube of the x-ray generator may be composed of a robust material like stainless steel instead of a fragile material like glass. This type of construction allows an operator of the MEXRAY to be self-shielded from the x-ray radiation. The MEXRAY generator may also efficiently convert mechanical work into x-rays, reducing the size of a battery pack or external power supply. The MEXRAY generator may also be relatively easy to construct and repair, and the dose rate and energy produced may be readily adjusted.

Furthermore, because vacuum is used as a dielectric material, the ability to generate high voltages in a compact package, i.e., a vacuum tube, allows the MEXRAY generator to be used in applications other than x-ray production. For example, the embodiments described herein may be used in other applications that require high voltage in a compact package such as electron guns.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a vacuum tube configured to generate high voltage electrons or high voltage ions, and comprises:
a high voltage source configured to charge a pair of capacitor plates to a predefined voltage, wherein
the pair of capacitor plates comprises a first plate and a second plate configured to produce a higher voltage over an AK gap than the predefined voltage, when the distance between the first plate and the second plate increases, and
the second plate comprises an emitter to allow breakdown emission of electrons to occur.

2. The apparatus of claim 1, wherein the vacuum tube is further configured to generate x-rays.

3. The apparatus of claim 1, wherein a charge separation is used to produce the higher voltage.

4. The apparatus of claim 3, wherein the charge separation is achieved when the first plate and the second plate are separated from each other.

5. The apparatus of claim 1, further comprising:
one or more actuators configured to place one or more discontinuous contactors in contact with the first plate, second plate, or both, wherein
the one or more discontinuous contactors are configured to charge the first plate, the second plate, or both to a predefined voltage.

6. The apparatus of claim 5, wherein when the first plate, the second plate, or both are charged to the predefined voltage, the one or more actuators are further configured to retract the one or more discontinuous contactors.

7. The apparatus of claim 1, further comprising:
one or more cams configured to increase separation between the first plate and the second plate after the first plate and the second plate are charged to a predefined voltage, wherein
the increase of separation between the first plate and the second plate increase the predefined voltage on an order of at least tens of kilovolts.

8. The apparatus of claim 7, wherein the one or more cams are driven by a one or more torsion springs or motor drives.

9. The apparatus of claim 1, wherein an increase of voltage on the second plate causes an emission of electrons or ions to ground or into an accelerator beamline.

10. The apparatus of claim 9, wherein the electrons are used to generate x-rays, or ions used for ion implantation.

11. The apparatus of claim 1, wherein the AK gap is located between an emitter and a target anode to create x-rays.

12. The apparatus of claim 11, wherein the emitter is configured to cause focused electrons to accelerate across the AK gap to the target anode, as the distance between the first plate and the second plate increases.

13. The apparatus of claim 12, wherein the emitter comprises cold-cathode material.

14. The apparatus of claim 1, wherein a size and weight of the vacuum tube scale linearly with an energy of a generated x-ray.

15. The apparatus of claim 1, wherein a size and weight of the vacuum corresponds to a specific use.

16. The apparatus of claim 1, wherein the vacuum tube is further configured to convert mechanical energy into high voltage at an efficiency of 90 percent or greater.

17. The apparatus of claim 1, wherein the vacuum tube is further configured to generate a cold-cathode electron or ion gun.

18. The apparatus of claim 1, the vacuum tube is configured to generate a promptly triggered x-ray source by use of a laser-triggered photocathode.

19. An electro-mechanical x-ray generator, comprising:
a pair of capacitor plates configured to be charged to a predefined voltage, wherein
the pair of capacitor plates are further configured to achieve a charge separation generating a higher voltage than the predefined voltage when a first plate and a second plate are separated from each other, wherein
the second plate comprises an emitter to allow breakdown emission of electrons to occur, and
the higher voltage is generated in a vacuum.

* * * * *